(12) United States Patent
Hong et al.

(10) Patent No.: US 11,758,571 B2
(45) Date of Patent: Sep. 12, 2023

(54) METHOD AND DEVICE FOR PROVIDING DIFFERENT SERVICES IN MOBILE COMMUNICATION SYSTEM

(71) Applicant: Samsung Electronics Co., Ltd., Suwon-si (KR)

(72) Inventors: Sungnam Hong, Suwon-si (KR); Yeohun Yun, Hwaseong-si (KR); Taeyoung Kim, Seoul (KR); Jiyun Seol, Seongnam-si (KR); Jongbu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 17/117,087

(22) Filed: Dec. 9, 2020

(65) Prior Publication Data

US 2021/0100008 A1 Apr. 1, 2021

Related U.S. Application Data

(63) Continuation of application No. 15/614,432, filed on Jun. 5, 2017, now Pat. No. 10,887,889.

(30) Foreign Application Priority Data

Jun. 7, 2016 (KR) .......................... 10-2016-0070450
Apr. 28, 2017 (KR) .......................... 10-2017-0055301

(51) Int. Cl.
*H04W 72/541* (2023.01)
*H04L 5/00* (2006.01)
(Continued)

(52) U.S. Cl.
CPC ......... *H04W 72/541* (2023.01); *H04L 1/1812* (2013.01); *H04L 1/1896* (2013.01);
(Continued)

(58) Field of Classification Search
CPC ... H04L 1/1816; H04L 1/1845; H04L 1/1896; H04L 1/1812; H04L 5/0062; H04L 5/0091; H04W 72/541; H04W 16/14
See application file for complete search history.

(56) References Cited

U.S. PATENT DOCUMENTS

| 8,072,929 B2 | 12/2011 | Frederiksen |
| 2003/0007480 A1 | 1/2003 | Kim et al. |

(Continued)

FOREIGN PATENT DOCUMENTS

| CN | 104468030 A | 3/2015 |
| KR | 10-2010-0020225 A | 2/2010 |

(Continued)

OTHER PUBLICATIONS

Korean Intellectual Property Office, "Office Action" dated Dec. 6, 2021, in connection with Korean Patent Application No. 10-2017-0055301, 8 pages.

(Continued)

*Primary Examiner* — Kevin C. Harper

(57) ABSTRACT

The present disclosure relates to a method and device for providing different services in a mobile communication system. In an embodiment, a base station sets interference influence information including information about interference of a second signal of a second system using a second TTI with regard to a first signal of a first system using a first transmission time interval (TTI). Also, the base station transmits the first signal of the first system to a terminal, and transmits the interference influence information to the terminal in a predetermined time. In a situation where different services coexist, an HARQ retransmission technique is provided for effectively overcoming a transmission failure caused by influence of interference between services.

12 Claims, 15 Drawing Sheets

(51) Int. Cl.
*H04L 1/1867* (2023.01)
*H04W 16/14* (2009.01)
*H04L 1/1812* (2023.01)
*H04W 88/08* (2009.01)

(52) U.S. Cl.
CPC .......... *H04L 5/0062* (2013.01); *H04L 5/0091* (2013.01); *H04W 16/14* (2013.01); *H04W 88/08* (2013.01)

(56) References Cited

U.S. PATENT DOCUMENTS

| | | | |
|---|---|---|---|
| 2003/0210669 A1* | 11/2003 | Vayanos | H04L 1/1845 370/335 |
| 2010/0042886 A1 | 2/2010 | Kim et al. | |
| 2010/0162069 A1 | 6/2010 | Niu et al. | |
| 2012/0005550 A1* | 1/2012 | Ito | H04L 1/0032 714/E11.131 |
| 2015/0256308 A1 | 9/2015 | Ma et al. | |
| 2015/0280871 A1 | 10/2015 | Xu et al. | |
| 2015/0334685 A1 | 11/2015 | Ji et al. | |
| 2015/0382362 A1 | 12/2015 | Park et al. | |
| 2016/0128045 A1 | 5/2016 | Azarian Yazdi et al. | |
| 2016/0234857 A1 | 8/2016 | Chen et al. | |
| 2016/0285589 A1 | 9/2016 | Mukkavilli et al. | |
| 2016/0352551 A1 | 12/2016 | Zhang et al. | |
| 2017/0164363 A1 | 6/2017 | Zhang et al. | |
| 2018/0317260 A1 | 11/2018 | Lee et al. | |
| 2019/0068318 A1* | 2/2019 | Marinier | H04L 1/0061 |
| 2020/0153563 A1* | 5/2020 | Kim | H04L 1/0071 |

FOREIGN PATENT DOCUMENTS

| | | |
|---|---|---|
| WO | 2015/179134 A1 | 11/2015 |
| WO | 2016/069379 A1 | 5/2016 |

OTHER PUBLICATIONS

Samsung, "Overview of CBG-based retransmission in NR", R1-1705401, 3GPP TSG RAN WG1 Meeting #88bis, Spokane, USA, Apr. 3-7, 2017, 4 pages.

International Search Report dated Sep. 1, 2017 in connection with International Patent Application No. PCT/KR2017/005638.

Huawei, HiSilicon, "Consideration on multiplexing of non-sTTI and sTTI in the same carrier", 3GPP TSG RAN WG1 Meeting #84bis, Apr. 11-15, 2016, 4 pages, R1-162590.

Huawei, HiSilicon, "The co-existence consideration of legacy TTI and sTTI in one carrier", 3GPP TSG RAN WG1 Meeting #85, May 23-27, 2016, 4 pages, R1-164068.

Etri, "Scalable TTI for new radio frame structure", 3GPP TSG RAN WG1 Meeting #84bis, Apr. 11-15, 2016, 5 pages, R1-162569.

Nokia et al., "Punctured Scheduling for Low Latency Transmissions", 3GPP TSG-RAN WG1 #85, May 23-27, 2016, R1-165381, 4 pages.

Office Action dated Nov. 20, 2020 in connection with Chinese Patent Application No. 201780035177.7, 22 pages.

Office Action dated Nov. 30, 2022 in connection with India Patent Application No. 202138047950, 5 pages.

\* cited by examiner

METHOD AND DEVICE FOR PROVIDING DIFFERENT SERVICES IN MOBILE COMMUNICATION SYSTEM

CROSS-REFERENCE TO RELATED APPLICATIONS

The present application is a continuation of U.S. patent application Ser. No. 15/614,432 filed on Jun. 5, 2017, which is based on and claims priority under 35 U.S.C. § 119(a) to Korean Patent Application No. 10-2016-0070450 filed on Jun. 7, 2016 and Korean Patent Application No. 10-2017-0055301 filed on Apr. 28, 2017, the disclosures of which are herein incorporated by reference in their entirety.

TECHNICAL FIELD

The present disclosure relates to a method and device for providing different services in a mobile communication system. More particularly, the present disclosure relates to a transmission/reception method for supporting effective hybrid automatic repeat and request (HARQ) in an environment allowing coexistence between heterogeneous services.

BACKGROUND

In order to meet an increasing demand for wireless data traffic after commercialization of the $4^{th}$ generation (4G) communication system, great efforts are underway to develop an improved $5^{th}$ generation (5G) or pre-5G communication system. For this reason, the 5G communication system or pre-5G communication system is also called the beyond-4G network communication system or the post LTE system.

In order to achieve a high data rate, the 5G communication system considers implementation in super-high frequency (mmWave) bands (e.g., 60 GHz band). In addition, to alleviate the path loss of radio waves in the super-high frequency bands and to increase the propagation distance of radio waves, a variety of techniques such as beamforming, massive multi-input multi-output (massive MIMO), full-dimensional MIMO (FD-MIMO), array antenna, analog beam-forming, and large scale antenna are now discussed in the 5G communication system.

Further, in order to improve the network of the system, the 5G communication system has developed an evolved small cell, an advanced small cell, a cloud radio access network (cloud RAN), an ultra-dense network, device-to-device (D2D) communication, wireless backhaul, a moving network, cooperative communication, coordinated multi-points (CoMP), interference cancellation, and the like. Besides, in the 5G system, hybrid FSK and QAM modulation (FQAM) and sliding window superposition coding (SWSC) are studied as advanced coding modulation (ACM) scheme, and filter bank multi carrier (FBMC), non-orthogonal multiple access (NOMA) and sparse code multiple access (SCMA) are studied as advanced access technique.

Compared to the existing 4G system, the 5G system considers support for various services. As examples of such services, there are an enhanced mobile broadband (eMBB) service, an ultra-reliable and low latency communication (URLLC) service, a massive machine type communication (mMTC) service, an evolved multimedia broadcast/multicast service (eMBMS), and the like. Normally, a system for providing the URLLC service may be referred to as a URLLC system, and a system for providing the eMBB service may be referred to as an eMBB system. Also, the terms service and system may be used interchangeably.

Among them, the URLLC service is a newly considered service in the 5G system, unlike the existing 4G system. The URLLC service requires a very high reliability (e.g., a packet error rate of about $10^{-5}$) and a low latency (e.g., about 0.5 msec) in comparison with other services. In order to meet such strict requirements, the URLLC service may require a transmission time interval (TTI) shorter than that of the eMBB service, and various operating schemes that utilize this are now considered.

SUMMARY

To address the above-discussed deficiencies, it is a primary object to provide an HARQ retransmission technique for effectively overcoming a transmission failure caused by influence of interference between services in a situation where different services coexist.

It is another object of the present disclosure to provide a new control channel for effectively operating the HARQ retransmission technique.

It is still another object of the present disclosure to provide an efficient operating method of a receiver utilizing the HARQ retransmission technique and the new control channel.

The objects of the present disclosure are not limited to the above-mentioned objects, and other objects not mentioned can be understood by those skilled in the art from the following description.

In order to accomplish the foregoing and other objects, a communication method of a base station according to an embodiment of the present disclosure may include setting interference influence information including information about interference of a second signal of a second system using a second TTI with regard to a first signal of a first system using a first transmission time interval (TTI); transmitting the first signal of the first system to a terminal; and transmitting the interference influence information to the terminal in a predetermined time.

Additionally, the interference influence information may include information indicating whether the first signal of the first system is affected by interference of the second signal of the second system.

Additionally, the interference influence information may include information about a region of the first signal of the first system affected by interference of the second signal of the second system.

Additionally, the method may further include retransmitting only a signal for a region of the first signal of the first system affected by interference of the second signal of the second system, wherein the interference influence information may include information about the interference-affected region of the first signal of the first system, and information indicating that only the signal for the interference-affected region of the first signal of the first system is retransmitted.

Additionally, the first system may be an enhanced mobile broad band (eMBB) system, and the second system may be an ultra-reliable and low latency communication (URLLC) system.

According to an embodiment of the present disclosure, a communication method of a terminal may include receiving a first signal of a first system using a first transmission time interval (TTI) from a base station; receiving interference influence information including information about interference of a second signal of a second system using a second TTI with regard to the first signal of the first system from the base station in a predetermined time; receiving a retransmission signal for the first signal of the first system from the base station; and performing a channel decoding of a received signal for the retransmission signal by using the interference influence information.

Additionally, the performing a channel decoding may include performing the channel decoding without combining the received signal for the retransmission signal with the first signal of the first system if the first signal of the first system is affected by interference of the second signal of the second system.

Additionally, the performing a channel decoding may include performing the channel decoding by combining the received signal for the retransmission signal with a signal of a region unaffected by interference of the second signal of the second system in the first signal of the first system if the first signal of the first system is affected by interference of the second signal of the second system.

Additionally, the performing a channel decoding may include performing the channel decoding by combining the received signal for the retransmission signal with a signal of a region unaffected by interference of the second signal of the second system in the first signal of the first system if the first signal of the first system is affected by interference of the second signal of the second system and if the base station retransmits only the signal for the interference-affected region of the first signal of the first system.

According to an embodiment of the present disclosure, a base station may include a transceiver configured to transmit and receive a signal to and from a terminal; and a controller configured to set interference influence information including information about interference of a second signal of a second system using a second TTI with regard to a first signal of a first system using a first transmission time interval (TTI), to transmit the first signal of the first system to the terminal, and to transmit the interference influence information to the terminal in a predetermined time.

According to an embodiment of the present disclosure, a terminal may include a transceiver configured to transmit and receive a signal to and from a base station; and a controller configured to receive a first signal of a first system using a first transmission time interval (TTI) from the base station, to receive interference influence information including information about interference of a second signal of a second system using a second TTI with regard to the first signal of the first system from the base station in a predetermined time, to receive a retransmission signal for the first signal of the first system from the base station, and to perform a channel decoding of a received signal for the retransmission signal by using the interference influence information.

According to embodiments of the present disclosure, it is possible to provide an HARQ retransmission technique for effectively overcoming a transmission failure caused by influence of interference between services in a situation where different services coexist. In addition, it is possible to provide a new control channel for effectively operating the HARQ retransmission technique. Also, it is possible to provide an efficient operating method of a receiver utilizing the HARQ retransmission technique and the new control channel.

The effects obtainable by the present disclosure are not limited to the above-mentioned effects, and other effects not mentioned can be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
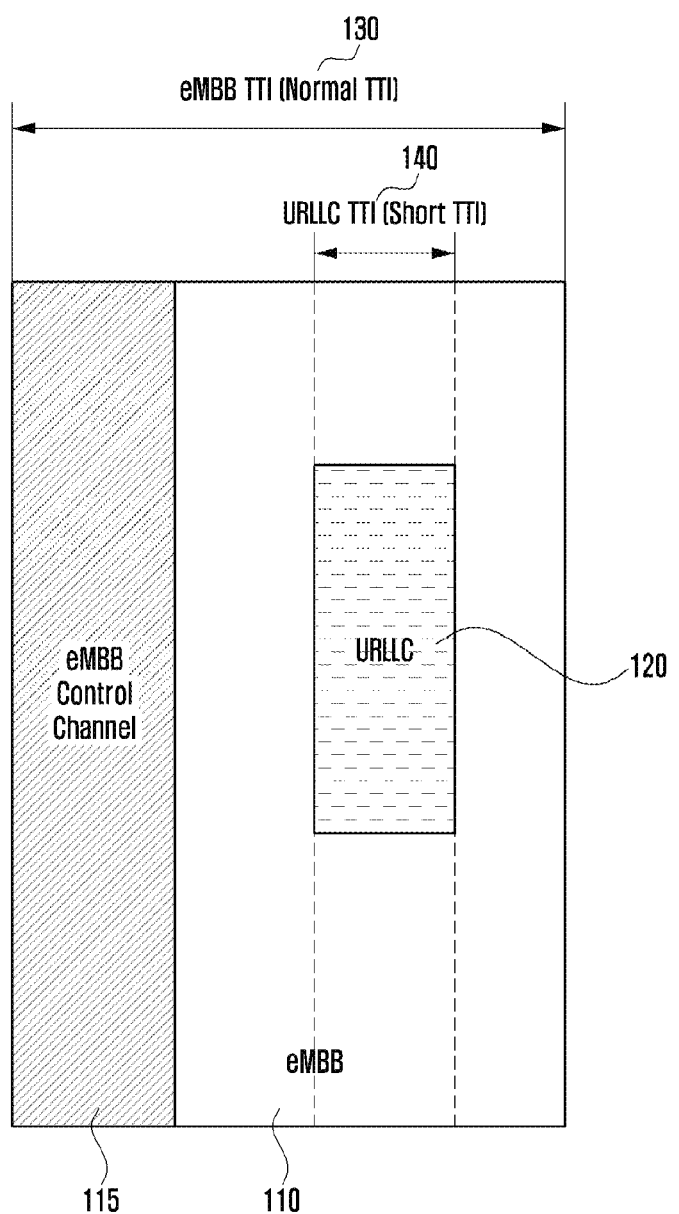
FIG. 1 illustrates an example of coexistence between an eMBB packet and a URLLC packet according to an embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged in an electronic device.

Hereinafter, embodiments of the present disclosure will be described in detail with reference to the accompanying drawings.

In the following description of the present disclosure, well known elements, functions, operations, techniques, etc. may not be described or illustrated in detail to avoid obscuring the subject matter of the present disclosure.

In this disclosure, when it is stated that a certain element is "coupled to" or "connected to" another element, such elements may be electrically, physically or logically coupled to or connected to each other. Also, both elements may be directly coupled or connected to each other, or a new element may exist between both elements. In addition, the terms "include", "comprise", and "have" as well as derivatives thereof, mean inclusion without limitation.

Elements shown in embodiments of this disclosure are used independently to represent different characteristic functions and do not necessarily mean that each element is composed of separate hardware or one software unit. Namely, respective elements are used exemplarily for convenience of description, and at least two elements may be integrated into one element, or one element may be divided logically or physically into a plurality of elements to perform similar or different functions. Any case is also included within the scope of the present disclosure, without departing from the essence of the present disclosure.

Some of elements used herein may not be essential for the present disclosure, but may be optional elements only to improve performance. This disclosure may be implemented with essential elements only or by further including optional elements.

In this disclosure, terms are defined in consideration of functions of this disclosure and may be varied depending on user or operator's intention or custom. Therefore, the definition should be made based on the contents throughout this description.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Figure 2:
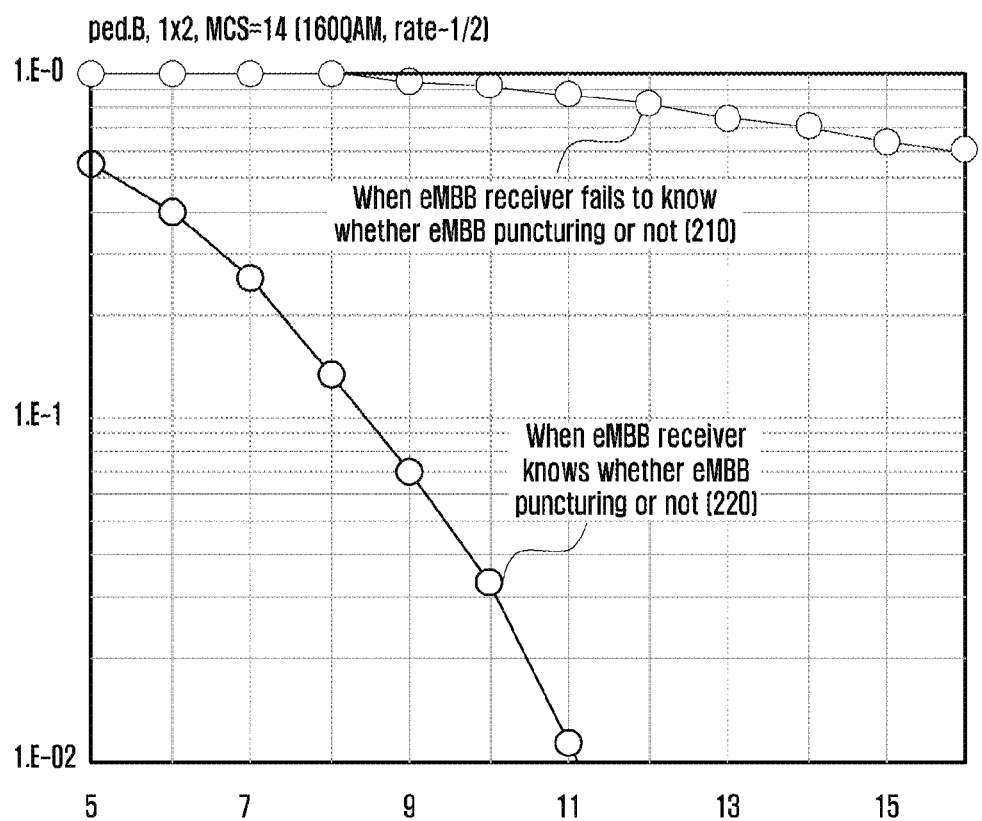
FIG. 2 illustrates an example performance of a terminal depending on whether an eMBB receiving terminal knows URLLC related information.

FIG. 1 illustrates an example coexistence between an eMBB packet and a URLLC packet according to an embodiment of the present disclosure, and FIG. 2 illustrates an example performance of a terminal depending on whether an eMBB receiving terminal knows URLLC related information.

When a time point comes to transmit a packet corresponding to a second service provided by a second system requiring high reliability and low latency while transmitting a packet corresponding to a first service provided by a first system having low reliability and less sensitivity to latency, a base station may allocate a resource to the packet corresponding to the second service. For example, the first service may be an enhanced mobile broadband (eMBB), and the first system may be an eMBB system. In addition, the second service may be an ultra-reliable and low latency communication (URLLC), and the second system may be a URLLC system. Hereinafter, for convenience of description, a mobile communication system in which the URLLC service and the eMBB service are simultaneously supported will be described as an example. However, the present disclosure is not limited thereto and may be similarly applied to other cases where different services are provided. For example, the present disclosure may also be applied to a mobile communication system that supports all of the URLLC service, the eMBB service, a massive machine type communication (mMTC) service, and an evolved multimedia broadcast/multicast service (eMBMS).

The URLLC service requires a very high reliability (e.g., a packet error rate of about 10-5) and a low latency (e.g., about 0.5 msec) in comparison with other services. For this reason, when it is time to transmit a URLLC packet 120 while transmitting an eMBB packet 110 as shown in FIG. 1, the base station may allocate a corresponding resource to the URLLC packet 120 instead of the eMBB packet 110.

Additionally, in a downlink network environment, the eMBB system may operate by scheduling based on an eMBB transmission time interval (TTI) 130. Also, the URLLC system may consider a scenario of operating by scheduling based on a shorter TTI 140. Here, the TTI 130 of eMBB may also be referred to as an eMBB TTI, a long TTI, a normal TTI, a first TTI, and the like, all of which mean a TTI applied to the eMBB service. The TTI 140 of URLLC may also be referred to as a URLLC TTI, a short TTI, a second TTI, and the like, all of which mean a TTI applied to the URLLC service. Meanwhile, although FIG. 1 shows that the URLLC TTI 140 is shorter than the eMBB TTI 130, this is not construed as a limitation. Alternatively, the URLLC TTI 140 may be longer than or equal to the eMBB TTI 130. However, for convenience of explanation, it is assumed that the URLLC TTI 140 is shorter than the eMBB TTI 130 by way of example. On the other hand, a terminal that receives or is able to receive the eMBB packet 110 through the eMBB service may be referred to as a terminal, an eMBB terminal, an eMBB receiving terminal, or the like for convenience of explanation.

As mentioned above, when it is time to transmit the URLLC packet 120 while transmitting the eMBB packet 110, the base station may allocate a corresponding resource to the URLLC packet 120 rather than to the eMBB packet 110. In this case, the eMBB packet 110 is affected as if puncturing or removing all data symbols to be transmitted in the corresponding resource.

According to this operation scheme, the resource allocation scheduling of the URLLC packet 120 can be performed after transmission of an eMBB control signal 115, so that it cannot guarantee that the base station transmits the eMBB control signal 115 that contains information about the presence or not of the URLLC packet 120 and related information. Therefore, the eMBB receiving terminal, i.e., the terminal capable of receiving the eMBB packet cannot receive the URLLC related information by means of the eMBB control signal 115.

In this case, the eMBB packet 110 may be affected by interference of the URLLC packet 120. Hereinafter, this interference caused by the URLLC packet 120 will be referred to as a URLLC interference, a URLLC interference signal, an interference influence signal, a URLLC interference influence signal, and the like, and information about the URLLC interference signal will be referred to as URLLC interference signal related information, interference signal information, interference influence information, and the like.

In this case, if the eMBB receiving terminal does not know information about the presence of the URLLC packet 120 in the allocated resource area thereof, the reception performance of the eMBB packet 110 may be considerably degraded as shown in FIG. 2.

In addition, FIG. 2 shows that, if the terminal that receives the eMBB packet cannot reflect the URLLC related information in the receiving technology, the eMBB packet may experience a very large performance deterioration even through the transmission signal of URLLC is considerably small.

Referring to FIG. 2, the case where the eMBB receiving terminal does not know whether there is puncturing in a part of a resource area allocated thereto is denoted as 210, and the case where the eMBB receiving terminal knows whether there is puncturing in such a part is denoted as 220. In the former case, the eMBB receiving terminal recognizes the URLLC data as the eMBB's own data and thus cannot decode received data. As a result, when a signal to noise ratio (SNR) increases, a block error rate (BLER) is hardly reduced.

On the other hand, in the latter case, the eMBB receiving terminal has a decreased BLER value according as the SNR increases. Therefore, compared with the case where the eMBB receiving terminal does not know whether there is puncturing in a part of the resource area allocated thereto, the eMBB receiving terminal can perform decoding in the case of knowing whether there is puncturing in such a part.

Actually, in the experimental environment of FIG. 2, the transmission signal of URLLC is merely about 10% or less of the transmission signal of eMBB. The reason for this performance deterioration is that the eMBB receiving terminal regards the signal of URLLC as the signal of the eMBB receiving terminal and attempts to decode a channel by utilizing the signal of URLLC.

Therefore, if the eMBB receiving terminal exactly knows the position of a resource used by URLLC, the eMBB reception performance is greatly improved as seen from FIG. 2. For this reason, the eMBB receiving terminal needs to know whether there is a resource used by URLLC in the allocated resource of the eMBB receiving terminal, but there is a case where the eMBB receiving terminal fails to obtain such information depending on operational techniques.

In this case, the eMBB receiving terminal may perform a channel decoding and a cyclic redundancy check (CRC) for a currently received signal in a state of failing to know information about an interference signal generated by the URLLC packet 120. Additionally, when a CRC failure occurs, the eMBB receiving terminal may transmit a NACK signal to the base station to apply a hybrid automatic repeat request (HARQ) method.

When a receiver, i.e., the eMBB receiving terminal, transmits the NACK signal, a transmitter, i.e., the base station, may retransmit the previous transmission signal at the next scheduling time. At this time, the base station may retransmit the same signal as the previous transmission signal to the eMBB receiving terminal. Alternatively, in other embodiments, the base station may transmit another version of parity bits for the previous transmission signal to the eMBB receiving terminal, or may send a new redundancy version formed in a combination of the above two methods. Accordingly, the eBB receiving terminal may receive the retransmission signal sent from the base station, combine the retransmission signal with the previous received signal, and perform a channel decoding.

Normally, the receiver (i.e., the eMBB receiving terminal) calculates a log-likelihood ratio (LLR) value per bit of a received signal and enters the log-likelihood ratio (LLR) value per bit as an input to a channel decoder. If a CRC fail occurs in the previous received signal due to the influence of a channel, the LLR has a value close to 0 since it is difficult to determine what the received signal is.

By the way, if the eMBB receiving terminal regards a URLLC signal as the signal of the eMBB receiving terminal and performs a channel decoding in a situation where the eMBB packet 110 is affected by interference of the URLLC packet 120, the LLR value has a large value rather than a value close to zero even though a CRC fail occurs. The reason that the CRC fail occurs is not a damage due to the influence of a channel but that the eMBB receiving terminal erroneously selects the received signal of the eMBB receiving terminal region due to erroneous information. Therefore, when the eMBB receiving terminal stores a received signal and then performs a channel decoding by combining with an HARQ retransmission signal, a greater performance deterioration may be generated rather than a case of not combining with the previous received signal. It is therefore necessary to apply more efficient HARQ transmission/reception technique than typical HARQ transmission/reception technique in an environment where such situations occur.

Meanwhile, in another embodiment, the eMBB receiving terminal may perform a blind detection for URLLC interference signal related information and then use the URLLC interference signal for receiving technique. In this case, the performance of the eMBB receiving terminal may be greatly improved as compared with a case of not utilizing the URLLC interference signal related information. However, if an error occurs in the result of a blind detection performed by the eMBB receiving terminal, the same problem as in a terminal that does not utilize the URLLC interference signal related information may appear. Therefore, in a system in which the eMBB service and the URLLC service are simultaneously supported, it is necessary to apply more efficient HARQ transmission/reception technique than typical HARQ transmission/reception technique.

In still another embodiment, a scenario may be considered in which the eMBB system and the URLLC system are scheduled and operated based on the eMBB TTI 130 in a downlink network environment. In this case, since the base station can also schedule the URLLC system at the time of scheduling the eMBB system, the base station can inform the eMBB receiving terminal of the existence of the URLLC packet 120 in the allocated resource of the eMBB receiving terminal through the control channel 115.

However, since information about the presence or absence of the URLLC packet 120 should be notified in units of small resource blocks, the amount of the information is likely to be very large. Therefore, if this information is notified to the eMBB receiving terminal through the control channel 115, the overhead of the control channel 115 may be increased considerably.

Therefore, it may be better that the base station partly provides the terminal with a clue to enable a blind detection of the information with suitable complexity through the control channel 115 such that the eMBB receiving terminal can blindly detect detailed information related to URLLC by utilizing this information. However, when an error occurs in the result of a blind detection performed by the terminal, the same problem as in the terminal that does not utilize the URLLC information may appear. Therefore, in a system in which eMBB and URLLC are simultaneously supported even in a case where a part of URLLC information can be delivered through the control channel 115, it is necessary to apply more efficient HARQ transmission/reception technique than typical HARQ transmission/reception technique.

Accordingly, when a NACK signal is received in response to a signal transmitted to the terminal, the base station according to an embodiment of the present disclosure may also transmit, in the transmission of a HARQ retransmission packet, interference influence information indicating whether any interference occurs due to a URLLC signal. Also, in the reception of the HARQ retransmission packet, the terminal may perform a channel decoding of the received packet by using the interference influence information.

In an alternative embodiment, when the URLLC signal interferes with the eMBB signal, the base station may transmit information about the occurrence of interference due to the URLLC signal to the terminal after a given time even before receiving the NACK signal from the terminal. Also, the base station may transmit the retransmission packet of the eMBB signal to the terminal after a given time even before receiving the NACK signal from the terminal.

Figure 3:
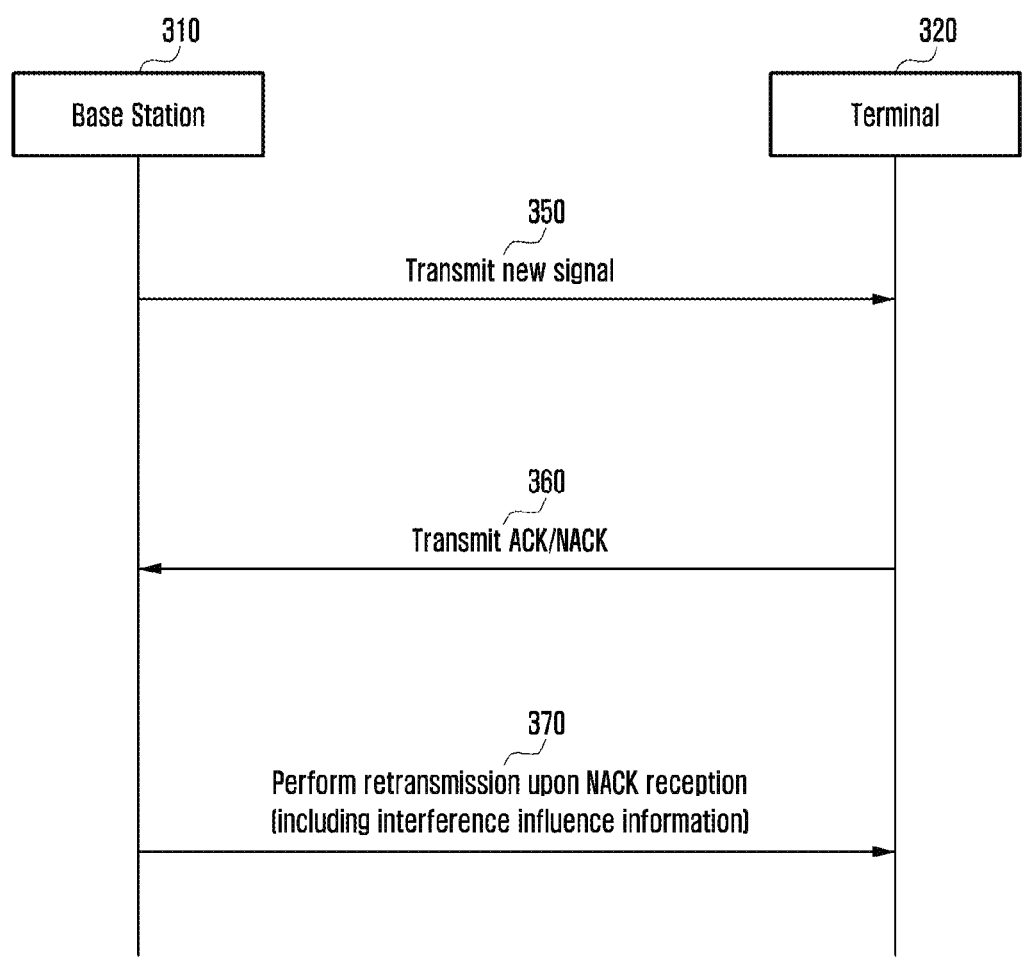
FIG. 3 illustrates an example operation between a base station and a terminal according to an embodiment of the present disclosure.

FIG. 3 illustrates an example operation between a base station and a terminal according to an embodiment of the present disclosure.

Referring to FIG. 3, at step 350, the base station 310 may transmit a new signal to the terminal 320. Here, the terminal 320 is a device capable of receiving an eMBB signal and thus may be referred to as an eMBB receiving terminal. The base station 310 can support both the eMBB service and the URLLC service, and the terminal 320 can receive a URLLC signal as well as the eMBB signal. The new signal is a signal associated with the first system, for example, the eMBB signal. The signal associated with the first system may be affected by interference of a signal associated with the second system. For example, the signal associated with the second system may be the URLLC signal.

Thereafter, in response to the signal received at step 350, the terminal 320 may transmit an ACK or NACK signal to the base station 310 at step 360.

If the base station 310 receives the NACK signal at step 360, the base station 310 may retransmit a packet to the terminal 320 at step 370. When retransmitting the packet, the base station 310 may also transmit interference influence information of the signal transmitted at step 350 to the terminal 320.

The interference influence information may include interference signal related information. Namely, if the signal transmitted at step 350 by the base station 310 is affected by interference of a signal of another system, the interference influence information may include information about occurrence of interference. For example, the interference influence information may include information indicating whether interference has occurred in the signal transmitted at step 350 by the base station 310 due to a signal transmitted from any other system. Namely, the base station 310 may transmit information indicating whether the first system signal is affected at step 350 by interference of the second system signal, together with the retransmission of the packet at step 370.

In addition, although not shown, the terminal 320 may receive a retransmitted packet and perform a channel decoding using the interference influence information.

Specifically, the interference influence information may include information indicating whether interference has occurred in a signal previously transmitted by the base station 310 due to a signal of any other system, and this information may be contained in the form of an identifier. This identifier may be referred to as an interference influence identifier. For example, the interference influence information may include information indicating whether the eMBB packet transmitted at step 350 is affected by interference of the URLLC packet. In this case, a URLLC interference influence identifier may be contained in the interference influence information. If there is any interference of the URLLC packet, the URLLC interference influence identifier may be one. If there is no interference, the URLLC interference influence identifier may be zero. Or vice versa.

The terminal 320 that receives the interference influence identifier may determine whether a previously received signal is affected by interference from a signal of another system. If so, the terminal 320 may not combine the retransmission signal, received at step 370, with the signal received at step 350.

Depending on embodiments, the interference influence information may further include information about a region affected by interference due to a signal of another system, in addition to the interference influence identifier. In this case, the information about the region affected by interference may be contained in the interference influence information in the form of an identifier. This may be referred to as an interference region identifier. If the interference is caused by the URLLC system signal, the interference influence region identifier may be referred to as a URLLC interference influence region identifier. In another embodiment, if the interference influence information includes information about a region affected by interference, the interference influence information may not include the interference influence identifier.

The terminal 320 that receives both the interference influence identifier and the interference influence region identifier may select a region, not affected by interference due to a signal of other system, in the previously received signal, i.e., the signal received at step 350. Then, for only the selected region, combining with the retransmission signal and channel decoding may be performed.

In addition, depending on embodiments, the base station 310 may retransmit, at step 370, only a signal of a region affected by interference due to a signal of another system. In this case, the interference influence information may further include information about a retransmission signal type, in addition to the interference influence identifier and the interference influence region identifier. The information about the retransmission signal type may include information about whether the base station 310 retransmits only a signal for a region affected by interference due to a signal of another system at step 370. This information about the retransmission signal type may be contained in the interference influence information in the form of a retransmission type identifier. This may also be referred to as a retransmission signal type identifier. In another embodiment, if the interference influence information includes information about a region affected by interference and information about a retransmission signal type, the interference influence information may not include the interference influence identifier.

The terminal 320 that receives the interference influence identifier, the interference influence region identifier, and the retransmission type identifier may select a signal of a region, not affected by interference due to a signal of other system, in the previously received signal, i.e., the signal received at step 350. Then, a channel decoding may be performed using a received signal for the retransmission signal as an additional parity of the signal for the selected region.

Meanwhile, although it is shown in the drawings that the base station 310 transmits the interference influence information to the terminal 320 upon receiving the NACK signal from the terminal 320, this is not to be construed as a limitation. For example, if the URLLC signal interferes with the eMBB signal transmitted by the base station 310 at step 350, the base station 310 may transmit the interference influence information to the terminal 320 after a given time before receiving the HARQ ACK/NACK signal from the terminal 320. Also, the base station 310 may transmit the eMBB retransmission packet to the terminal 20 after a given time before receiving the HARQ ACK/NACK signal from the terminal 320.

Specifically, in case of transmitting the eMBB signal to the terminal 320 at step 350, the base station 310 may have already known whether the eMBB signal is affected by interference of the URLLC signal, even before receiving the NACK signal from the terminal 320. Therefore, even before the NACK signal is received from the terminal 320, the base station 310 may transmit the interference influence information to the terminal 320 after transmitting the eMBB signal. For example, if the eMBB signal is transmitted in the n-th eMBB TTI, the interference influence information may be transmitted through the (n+k)-th eMBB TTI. Here, the (n+k)-th eMBB TTI may be ahead of the retransmission eMBB TTI according to the HARQ ACK/NACK.

The terminal 320 may receive the interference influence information before transmitting the HARQ NACK signal and may confirm that the eMBB signal is affected by interference of the URLLC signal.

In addition, the base station 310 may transmit the retransmission signal while or after transmitting the interference influence information to the terminal 320. Namely, the base station 310 may transmit the retransmission signal even before receiving the HARQ ACK/NACK signal from the terminal 320. At this time, the retransmission signal may include only the eMBB signal for the region affected by interference.

Meanwhile, the interference influence information may be included in the control channel and transmitted to the terminal. For example, the interference influence information may be added to the PDCCH or EPDCCH with an m-bit identifier (m is a predetermined value of 1 or more) and transmitted to the terminal.

Now, detailed operations of the base station 310 and the terminal 320 will be described.

Figure 4:
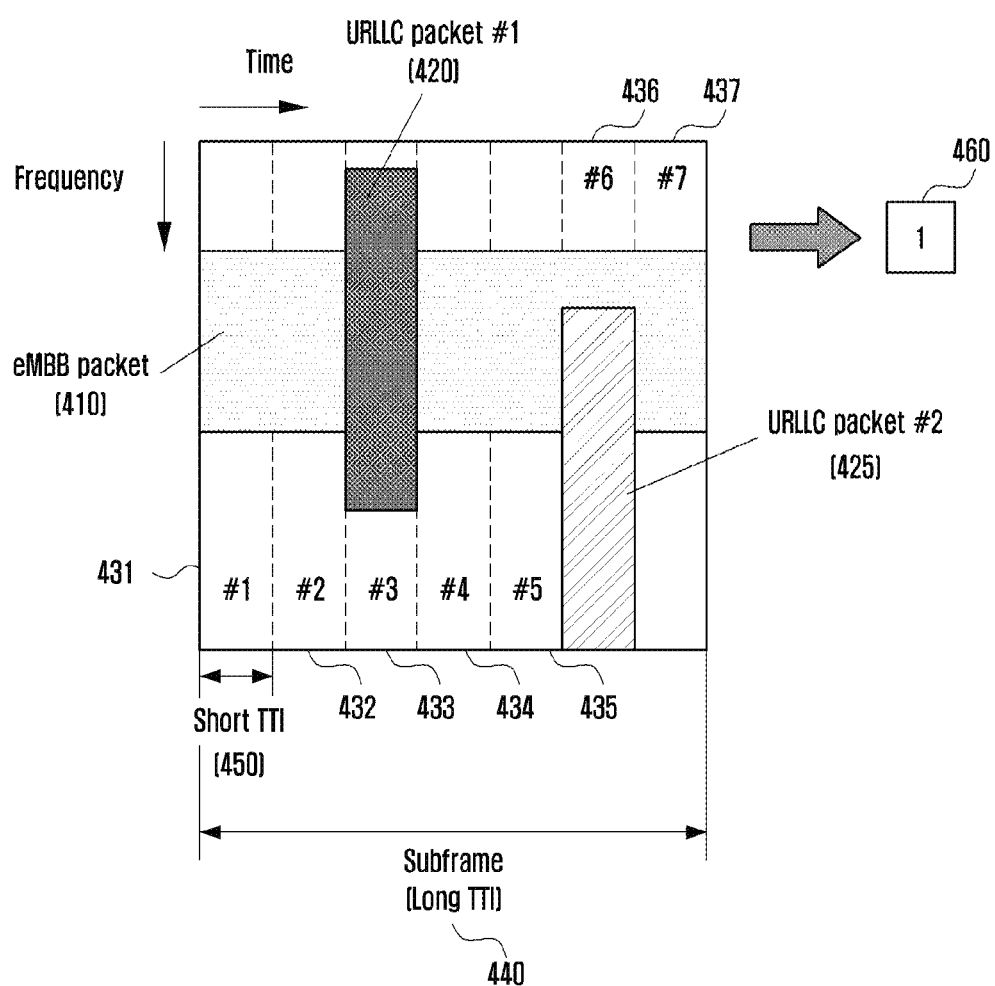
FIG. 4 illustrates example interference influence information in case of coexistence between an eMBB packet and a URLLC packet according to an embodiment of the present disclosure.
Figure 5:
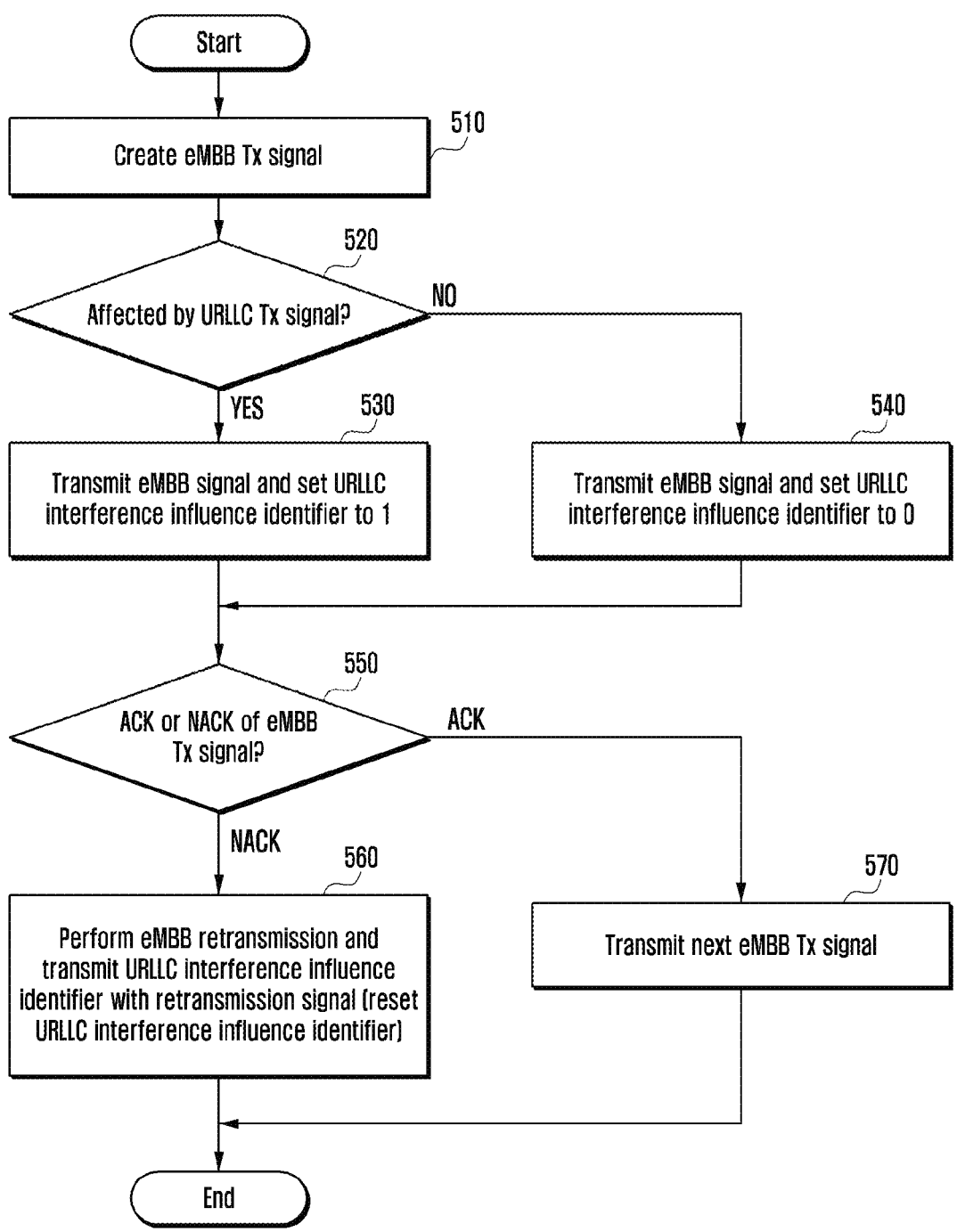
FIG. 5 illustrates an example operation of a base station according to an embodiment of the present disclosure.
Figure 6:
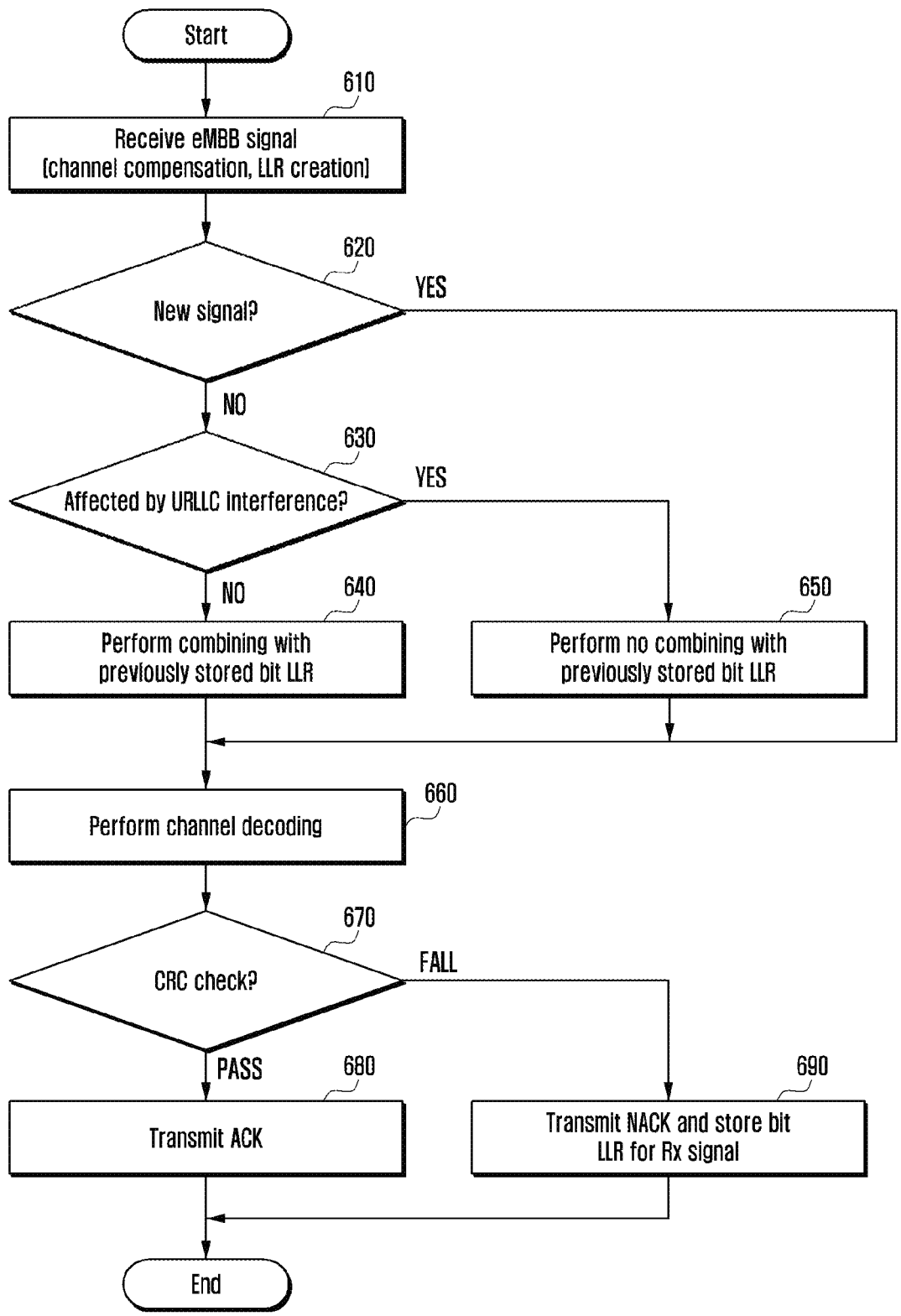
FIG. 6 illustrates an example operation of a terminal according to an embodiment of the present disclosure.

FIG. 4 illustrates an example interference influence information in case of coexistence between an eMBB packet and a URLLC packet according to an embodiment of the present disclosure, FIG. 5 illustrates an example operation of a base station according to an embodiment of the present disclosure, and FIG. 6 illustrates an example operation of a terminal according to an embodiment of the present disclosure.

As described above, the first and second services may be provided by the first system using the first TTI 440 and the second system using the second TTI 450, respectively, by the base station 310 and the terminal 320. Hereinafter, it is assumed that the first system using the first TTI 440 is an eMBB system and the second system using the second TTI 450 is a URLLC system. In addition, a subframe 430 is divided into the first region 431 to the seventh region 437 in units of time corresponding to the second TTI 450. Although FIG. 4 exemplarily shows that the subframe 430 is divided into seven regions, this is not to be construed as a limitation. Depending on the lengths of the first TTI 440 and the second TTI 450, the subframe 430 may be divided into more than or less than seven regions. Each of the first to seventh regions 431 to 437 may include at least one orthogonal frequency division multiplexing (OFDM) symbol. For example, each region may include two OFDM symbols.

An eMBB packet 410 may be transmitted through a specific frequency region of all the subframes 430; 431, 432, 433, 434, 435, 436 and 437 according to the first TTI 440. In addition, URLLC packets 420 and 425 may be scheduled according to the second TTI 450. If a time point comes to transmit the URLLC packets 420 and 425 while transmitting the eMBB packet 410, the base station 310 may allocate resources to the URLLC packets 420 and 425. For example, the first URLLC packet 420 may be transmitted in the third region 433, and the second URLLC packet 425 may be transmitted in the sixth area 436. Additionally, the eMBB packet 410 may be affected by interference of the first and second URLLC packets 420 and 425. According to an embodiment, as shown in FIG. 4, the eMBB packet 410 may be completely affected by interference of the first URLLC packet 420 in the third region, and the eMBB packet 410 may be partially affected by interference of the second URLLC packet 425 in the sixth region 436.

In this case, the base station 310 may inform the terminal 320 of information 460 as to whether a transmission signal before an HARQ retransmission packet is affected by interference due to a signal of any other system.

For this, when a retransmission request signal (e.g., a NACK signal) is received from the terminal 320, the base station 310 may transmit a retransmission signal including interference influence information to the terminal 320 during retransmission of the eMBB packet. Here, the interference influence information may include an interference influence identifier 460, e.g., a URLLC interference influence identifier. In case of FIG. 4, the base station 310 may set the URLLC interference influence identifier 460 to correspond to true (e.g., may set the interference influence identifier 460 to 1) and insert the URLLC interference influence identifier 460 into the retransmission signal to be transmitted to the terminal 320.

Alternatively, in another embodiment, the base station 310 may transmit the interference influence information 460 to the terminal 320 before receiving the HARQ ACK/NACK signal from the terminal 320. Also, the base station 310 may retransmit the eMBB packet affected by interference to the terminal 320 before receiving the HARQ ACK/NACK signal from the terminal 320.

Meanwhile, in still another embodiment, the base station 310 may add the URLLC interference influence identifier 460 to a control channel to be transmitted to the terminal 320. For example, the URLLC interference influence identifier 460 may be added to PDCCH or EPDCCH as a 1-bit identifier and then transmitted to the terminal 320. Also, in yet another embodiment, the interference influence identifier 460 may be transmitted through downlink control information (DCI) of the PDCCH.

The operation of the base station 310 will be described in more detail with reference to FIG. 5. At step 510, the base station 310 may create an eMBB transmission (Tx) signal. The eMBB transmission signal is a signal serviced by the eMBB system using the first TTI 440, and may include the eMBB packet and control information thereof.

At step 520, the base station 310 may determine whether the eMBB transmission signal is affected by the URLLC transmission signal. Namely, the base station 310 may determine whether the eMBB packet 410 is affected by interference of the URLLC packets 420 and 425.

If the eMBB packet 410 is affected by interference of the URLLC packets 420 and 425, the base station 310 may set, at step 530, information about whether there is influence of URLLC interference. For example, the base station 310 may set the URLLC interference influence identifier 460 to correspond to true (e.g., set the URLLC interference influence identifier 460 to 1). The URLLC interference influence identifier 460 may be stored in the base station 310 until a response signal for the transmission signal is received. Then the base station 310 may transmit the eMBB signal to the terminal 320. In another embodiment, when the eMBB packet 410 is affected by interference of the URLLC packets 420 and 425, the base station 310 may transmit the set URLLC interference influence identifier 460 to the terminal 320. Namely, even before receiving the HARQ ACK/NACK signal from the terminal 320, the base station 310 may transmit the eMBB signal and then transmit the interference influence information 460 to the terminal 320 at step 530. For example, if the eMBB signal is transmitted in the n-th eMBB TTI, the interference influence information 460 may be transmitted through the (n+k)-th eMBB TTI. In this case, the (n+k)-th eMBB TTI may be ahead of the retransmission eMBB TTI according to the HARQ ACK/NACK. Also, the base station 310 may retransmit the eMBB packet at step 560 regardless of whether the terminal 320 has received the HARQ NACK signal. For example, if the eMBB signal is transmitted in the n-th eMBB TTI, the retransmission eMBB packet may be transmitted through the (n+k)-th eMBB TTI which may be ahead of the retransmission eMBB TTI according to the HARQ ACK/NACK.

On the other hand, if the eMBB packet 410 is not affected by interference of the URLLC packets 420 and 425, the base station 310 may set, at step 540, the URLLC interference influence identifier 460 to correspond to be false (e.g., set the URLLC interference influence identifier 460 to 0). The URLLC interference influence identifier 460 may be stored in the base station 310 until a response signal for the transmission signal is received. Then the base station 310 may transmit the eMBB signal to the terminal 320.

Meanwhile, in another embodiment, the base station 310 may transmit the eMBB signal to the terminal 320 at step 530 or 540 and then check a response message for the eMBB transmission signal at step 550. Namely, the base station 310 may confirm receipt of the ACK or NACK signal for the eMBB transmission signal.

If the ACK signal for the transmission signal is received, the base station 310 may create the next eMBB transmission signal and transmit the created signal to the terminal 320 at step 570. In this case, operations similar to steps 510 to 550 may be performed. In some embodiment, the base station 310 may initialize the URLLC interference influence identifier 460 stored at step 530 or 540 if the ACK signal is received from the terminal 320.

On the other hand, if the NACK signal for the transmission signal is received, the base station 310 may retransmit the eMBB packet at step 560. At this time, the base station 310 may transmit the URLLC interference influence identifier 460 set at step 530 or 540 to the terminal 320 together with the retransmission signal. In some embodiment, the base station 310 may add the URLLC interference influence identifier 460 to the control channel and transmit the URLLC interference influence identifier 460 to the terminal 320. For example, the URLLC interference influence identifier 460 may be added to PDCCH or EPDCCH as a 1-bit identifier and transmitted to the terminal 320. Also, in some embodiment, the base station 310 may initialize the URLLC interference influence identifier 460 after transmitting the retransmission signal including the URLLC interference influence identifier 460 to the terminal 320.

Next, the operation of the terminal 320 will be described in more detail with reference to FIG. 6. At step 610, the terminal 320 may receive a signal. This signal may be an eMBB signal. In some embodiment, the terminal 320 may perform channel compensation and create a bit LLR for the received signal.

At step 620, the terminal 320 may determine whether the signal received at step 610 corresponds to a new signal or a retransmission signal.

If it is determined at step 620 that the signal received at step 610 is a new signal, the terminal 320 may perform a channel decoding at step 660.

On the other hand, if it is determined at step 620 that the signal received at step 610 is not new signal, the terminal 320 may determine this signal as a retransmission signal.

In addition, at step 630, the terminal 320 may check the interference influence information contained in the received retransmission signal. Since the interference influence information may include the URLLC interference influence identifier 460, the terminal 320 may confirm whether the signal received before the retransmission signal received at step 610 is affected by interference of the URLLC packets 420 and 425. Namely, by checking the URLLC interference influence identifier 460, the terminal 320 may know whether the previously received signal is affected by interference of a signal of the URLLC system.

If it is determined that the previously received signal is not affected by interference of the URLLC signal, the terminal 320 may combine, at step 640, the currently received retransmission signal with the LLR stored for the previously received signal.

On the other hand, if it is determined that the previously received signal is affected by interference of the URLLC signal, the terminal 320 may not combine, at step 650, the currently received retransmission signal with the LLR stored for the previously received signal.

As described above, if the terminal 320 regards the URLLC signal as the signal of the terminal 320 and performs a channel decoding in a situation where the eMBB packet 410 is affected by interference of the URLLC packets 420 and 425, and if a CRC fail occurs accordingly, the LLR value has a large value rather than a value close to zero. Therefore, when the terminal 320 stores such a received signal and then performs a channel decoding by combining with the retransmission signal, a large deterioration may be caused. Therefore, at step 650, the terminal 320 may not combine the currently received retransmission signal with the LLR of the previously received signal at step 650.

After step 640 or 640 or if the new signal is received as a result of determination at step 620, the terminal 320 may perform a channel decoding at step 660. Then the terminal 320 may perform a CRC check at step 670.

If the CRC check is successful, the terminal 320 may transmit an ACK message to the base station 310 at step 680.

If the CRC check fails, the terminal 320 may transmit a NACK message to the base station 310 at step 690. At this time, in some embodiment, the terminal 320 may create and store a bit LLR for the currently received signal. Alternatively, the terminal 320 may store the LLR created at step 610. Thereafter, the terminal 320 receives the signal retransmitted by the base station 310 in response to the NACK message, and may perform steps 610 to 670.

As discussed heretofore, the base station 310 may add a 1-bit indicator to the control channel of the HARQ retransmission packet so as to inform whether the previous transmission signal of the HARQ retransmission packet is affected by interference of a signal of any other system, and then transmit the 1-bit indicator to the terminal 320. Alternatively, the base station 310 may transmit the interference influence information to the terminal 320 even before receiving the HARQ ACK/NACK signal from the terminal 320. Also, the base station 310 may transmit the eMBB retransmission packet to the terminal 320 even before receiving the HARQ ACK/NACK signal from the terminal 320.

Then the terminal 320 receives the interference influence information and the HARQ retransmission packet and, if the previously received signal is affected by interference of the signal of any other system, may perform a channel decoding without combining the previously received signal with the retransmission signal.

Figure 7:
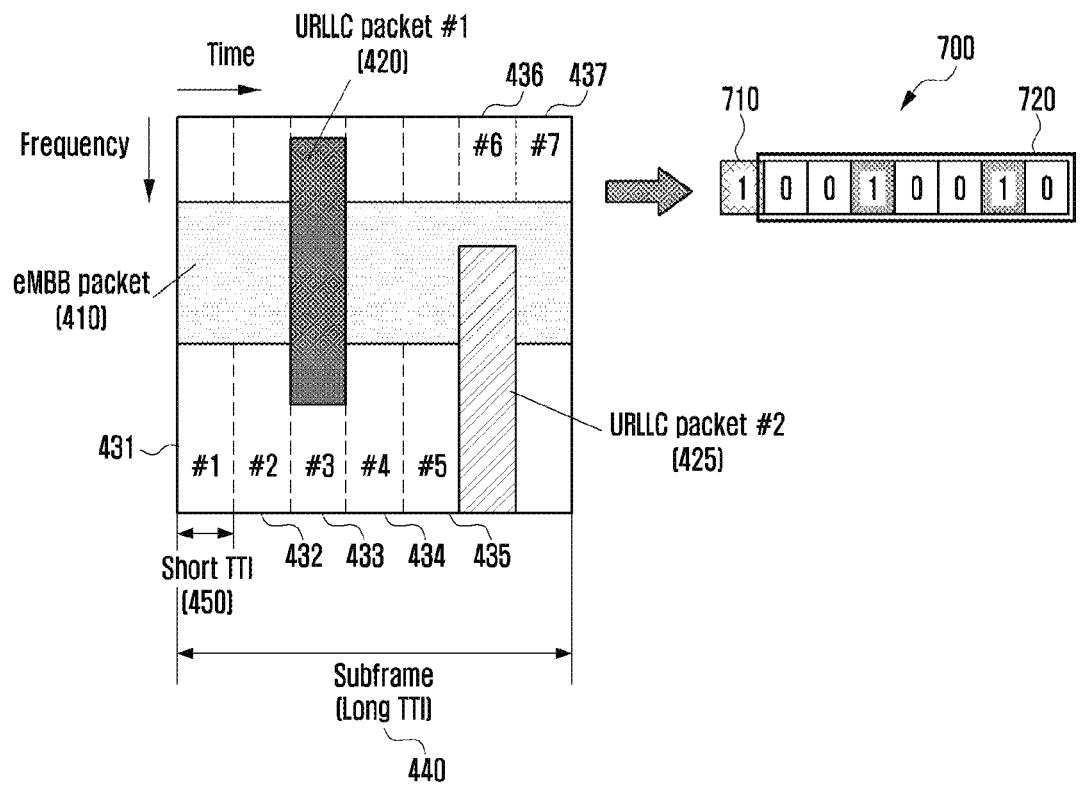
FIG. 7 illustrates another example interference influence information in case of coexistence between an eMBB packet and a URLLC packet according to an embodiment of the present disclosure.
Figure 8:
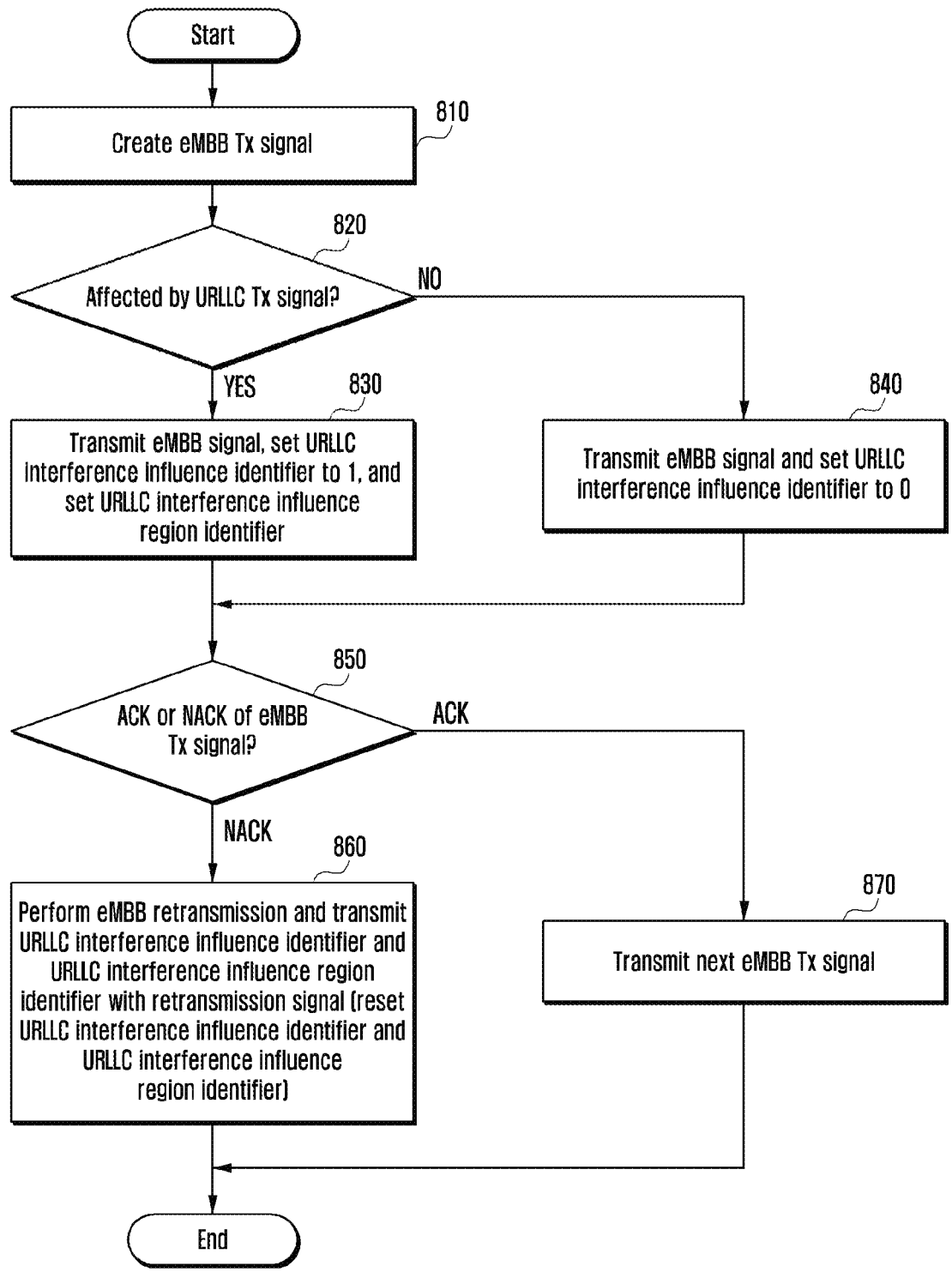
FIG. 8 illustrates an example operation of a base station according to another embodiment of the present disclosure.
Figure 9:
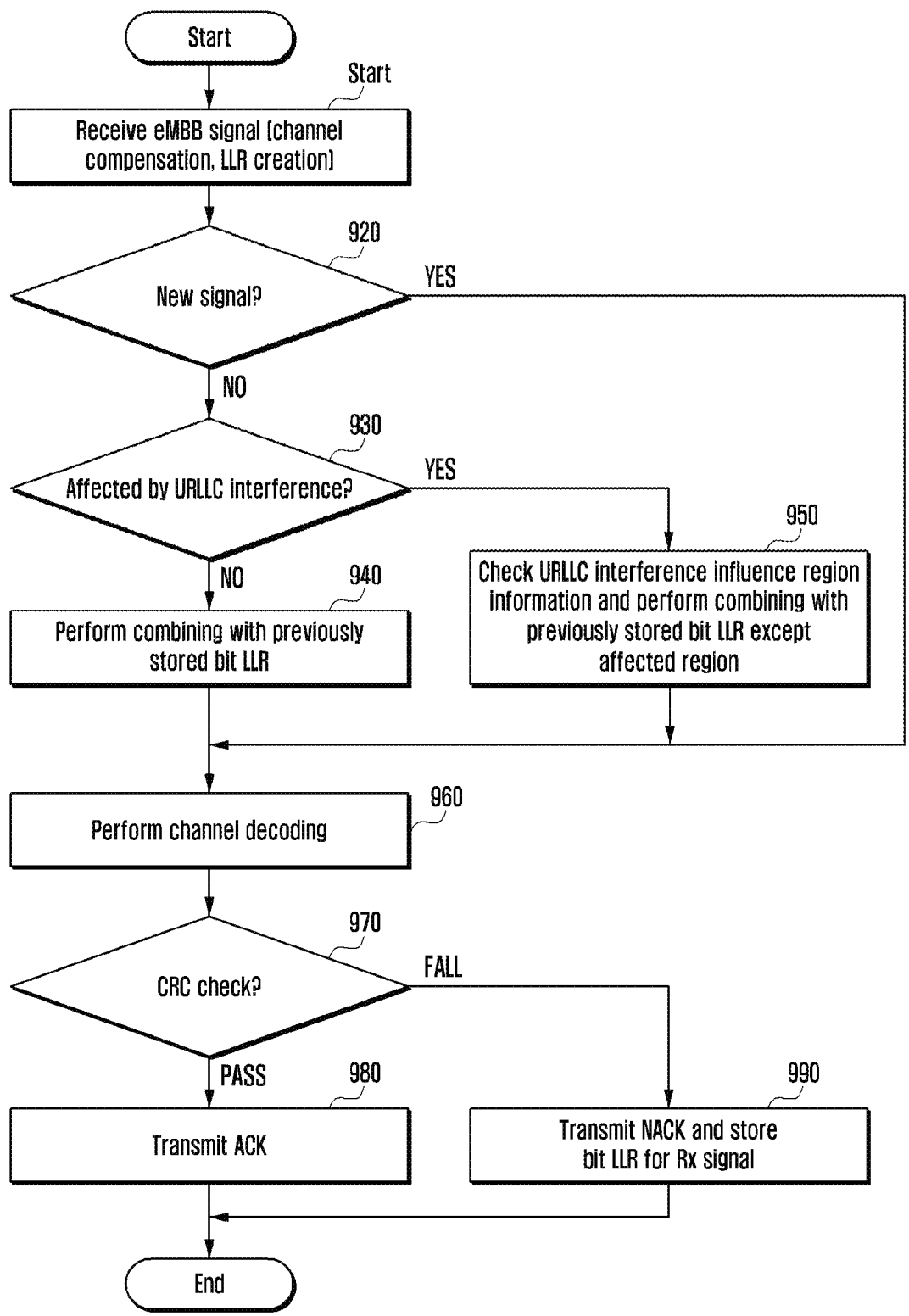
FIG. 9 illustrates an example operation of a terminal according to another embodiment of the present disclosure.

FIG. 7 illustrates another example interference influence information in case of coexistence between an eMBB packet and a URLLC packet according to an embodiment of the present disclosure, FIG. 8 illustrates an example operation of a base station according to another embodiment of the present disclosure, and FIG. 9 illustrates an example operation of a terminal according to another embodiment of the present disclosure.

Referring to FIG. 7, the eMBB packet 410 may be transmitted through a specific frequency region of all the subframes 430; 431, 432, 433, 434, 435, 436 and 437 according to the first TTI 440. In addition, the URLLC packets 420 and 425 may be scheduled according to the second TTI 450. For example, as earlier described in FIG. 4, the first URLLC packet 420 may be transmitted in the third region 433, and the second URLLC packet 425 may be transmitted in the sixth area 436.

In this case, the base station 310 may inform the terminal 320 of information as to whether a transmission signal before an HARQ retransmission packet is affected by interference due to a signal of any other system. In addition, as earlier described in FIGS. 3 to 6, interference influence information 700 may include an interference influence identifier 710, e.g., a URLLC interference influence identifier.

Additionally, the interference influence information 700 may further include information 720 about a region affected by interference due to a signal of another system. In this case, the information 720 about the region affected by interference may be referred to as an interference influence region identifier 720, e.g., a URLLC interference influence region identifier. If the interference influence information 700 has the information 720 about the region affected by interference, the interference influence information 700 may not include the interference influence identifier 710 in some embodiment.

For example, the base station 310 may set the interference influence region identifier 720 to indicate whether the previous transmission signal for one or more OFDM symbols has been affected by interference due to a signal of another system. In case of indicating whether the previous transmission signal for one OFDM symbol has been affected by interference, the interference influence region identifier 720 may be a 14-bit identifier (based on LTE subframe (14 OFDM symbols)) since a 1-bit identifier can be added per OFDM symbol. Alternatively, in case of indicating whether the previous transmission signal for two OFDM symbols has been affected by interference, the interference influence region identifier 720 may be a 7-bit identifier since a 1-bit identifier can be added per 2 OFDM symbols. In other embodiments, the interference influence region identifier 720 may be a 5-bit identifier for 3 OFDM symbols, or a 3-bit identifier for 4 OFDM symbols. Also, depending on embodiments, the interference influence region identifier 720 may be set according to one or more slots, according to one or more resource blocks (RBs) or physical resource blocks (PRBs), according to one or more RB groups, according to one or more resource elements (REs), according to one or more RE groups, according to one or more code blocks (CB), according to one or more CB group, according to one or more symbol groups, according to one or more mini-slot groups, according to one or more slots, or according to one or more transport blocks (TBs). Here, the slot may correspond to the normal TTI (long TTI) 130 shown in FIG. 1, a mini-slot may correspond to the short TTI 140, and the mini-slot group may include a plurality of mini-slots 140.

In addition, for each region of the interference influence region identifier 720, the identifier may be set to correspond to be true (e.g., 1) in case of the region in which the previous transmission signal is affected by interference due to a signal of another system, and may be set to correspond to be false (e.g., 0) in case of the region not affected by interference.

In a situation as shown in FIG. 7, the eMBB packet 410 transmitted in the first region 431, the second region 432, the fourth region 434, the fifth region 435 and the seventh region 437 is not affected by interference of the URLLC packets 420 and 425. However, the eMBB packet 410 transmitted in the third region 433 is affected by interference of the first URLLC packet 420, and the eMBB packet 410 transmitted in the sixth region 436 is affected by interference of the second URLLC packet 425. In this case, the interference influence region identifier 720 may be set as "0010010" to indicate information about the interference-affected region. This is, however, exemplary only and not to be construed as a limitation. Any other form of the interference influence region identifier 720 capable of indicate the third and sixth regions 433 and 436 affected by interference may be possible. For example, the interference influence region identifier 720 may be set as "1101101".

The region affected by interference may be a region having puncturing and URLLC data (URLLC packets) 420 and 425 inserted therein (or allocated thereto) in the eMBB packet 410. Namely, a puncturing region of the eMBB packet 410 may be referred to as a region affected by interference or an interference-affected region. Therefore, terms such as interference-affected region, interference influence region identifier, puncturing information, and information about a puncturing region may be used together.

The interference influence identifier 710 and/or the interference influence region identifier 720 may be contained in the interference influence information 700 and transmitted to the terminal 320 when the HARQ retransmission packet is transmitted through the control channel.

Alternatively, in some embodiment, the base station 310 may transmit the interference influence information 700 to the terminal 320 even before receiving the HARQ ACK/NACK signal from the terminal 320. Also, the base station 310 may retransmit the eMBB packet affected by interference to the terminal 320 even before receiving the HARQ ACK/NACK signal from the terminal 320.

Meanwhile, in some embodiment, the base station 310 may add the interference influence information 700 to the control channel and transmit the interference influence information 700 to the terminal 320. For example, the interference influence information 700 may be added to PDCCH or EPDCCH as an m-bit identifier and transmitted to the terminal 320. Here, the size of the m bits may be determined by how many regions the data area is divided into. Also, in some embodiment, the interference influence information 700 may be transmitted through DCI of PDCCH.

The terminal 320 that receives the interference influence information 700 including the information 720 about the region affected by interference may estimate a detailed region affected by interference (i.e., a detailed puncturing region) by using the LLR value stored in a soft buffer. Namely, the terminal 320 that receives information about a rough region (e.g., a symbol group, a mini-slot group, a slot, etc.) including the region affected by interference through the interference influence region identifier 720 may estimate the detailed puncturing region by using this information and the LLR value. A related description will be described later.

The operation of the base station 310 will be described in more detail with reference to FIG. 8. At step 810, the base station 310 may create an eMBB transmission (Tx) signal. The eMBB transmission signal is a signal serviced by the eMBB system using the first TTI 440, and may include the eMBB packet and control information thereof.

At step 820, the base station 310 may determine whether the eMBB transmission signal is affected by the URLLC transmission signal. Namely, the base station 310 may determine whether the eMBB packet 410 is affected by interference of the URLLC packets 420 and 425.

If the eMBB packet 410 is affected by interference of the URLLC packets 420 and 425, the base station 310 may set, at step 830, information 710 about whether there is influence of URLLC interference. For example, the base station 310 may set the URLLC interference influence identifier 710 to 1. The URLLC interference influence identifier 710 may be stored in the base station 310 until a response signal for the transmission signal is received. Then the base station 310 may transmit the eMBB signal to the terminal 320.

In addition, at step 830, the base station 310 may further set information 720 about a region affected by interference due to a signal of any other system. For example, the base station 310 may add a 1-bit identifier per two OFDM symbols to set a 7-bit URLLC interference influence region identifier 720 per subframe. In an example of FIG. 7, the URLLC interference influence region identifier 720 may be set to and stored as 0010010.

In another embodiment, when the eMBB packet 410 is affected by interference of the URLLC packets 420 and 425, the base station 310 may transmit the interference influence information 700 including the set URLLC interference influence region identifier 720 to the terminal 320. Namely, even before receiving the HARQ ACK/NACK signal from the terminal 320, the base station 310 may transmit the eMBB signal and then transmit the interference influence information 700 to the terminal 320 at step 830. In this case, the interference influence information 700 may further include the URLLC interference influence identifier 710. Also, the base station 310 may retransmit the eMBB packet at step 860 regardless of whether the HARQ NACK signal is received from the terminal 320. For example, if the eMBB signal is transmitted in the n-th eMBB TTI, the interference influence information 700 may be transmitted through the (n+k)-th eMBB TTI. In this case, the (n+k)-th eMBB TTI may be ahead of the retransmission eMBB TTI according to the HARQ ACK/NACK. Also, if the eMBB signal is transmitted in the n-th eMBB TTI, the retransmission eMBB packet may be transmitted through the (n+k)-th eMBB TTI which may be ahead of the retransmission eMBB TTI according to the HARQ ACK/NACK.

On the other hand, if the eMBB packet 410 is not affected by interference of the URLLC packets 420 and 425, the base station 310 may set, at step 840, the URLLC interference influence identifier 710 to correspond to be false (e.g., set the URLLC interference influence identifier to 0). The URLLC interference influence identifier may be stored in the base station 310 until a response signal for the transmission signal is received. Then the base station 310 may transmit the eMBB signal to the terminal 320. In this case, the base station 310 may not set the URLLC interference influence region identifier 720 (i.e., only the URLLC interference influence identifier 710 may be contained in the interference influence information 700), or set the URLLC interference influence region identifier 720 as a default value, or set the URLLC interference influence region identifier 720 to 0000000.

Meanwhile, in another embodiment, the base station 310 may transmit the eMBB signal to the terminal 320 at step 830 or 840 and then check a response message for the eMBB transmission signal at step 850.

If the ACK signal for the transmission signal is received, the base station 310 may create the next eMBB transmission signal and transmit the created signal to the terminal 320 at step 870. In some embodiment, the base station 310 may initialize the URLLC interference influence identifier 710 and/or the URLLC interference influence region identifier 720 stored at step 830 or 840 if the ACK signal is received from the terminal 320.

On the other hand, if the NACK signal for the transmission signal is received, the base station 310 may retransmit the eMBB packet at step 860. At this time, the base station 310 may transmit the URLLC interference influence identifier 710 set at step 830 or 840 to the terminal 320 together with the retransmission signal.

In this case, if the URLLC interference influence region identifier 720 is set at step 830, the base station 310 may transmit the URLLC interference influence region identifier 720 to the terminal 320 together with the retransmission signal at step 860.

In some embodiment, the base station 310 may add the URLLC interference influence identifier 710 and/or the URLLC interference influence region identifier 720 to the control channel and transmit the URLLC interference influence identifier 710 and/or the URLLC interference influence region identifier 720 to the terminal 320. For example, the interference influence information 700 including the URLLC interference influence identifier 710 and/or the URLLC interference influence region identifier 720 may be added to PDCCH or EPDCCH and transmitted to the terminal 320. In this case, the URLLC interference influence identifier 710 may be 1 bit, and the URLLC interference influence region identifier 720 may have a size of 7 bits when the URLLC interference influence region identifier 720 is set to 1 bit per 2 OFDM symbols.

Also, in some embodiment, the base station 310 may initialize the URLLC interference influence identifier 710 and/or the URLLC interference influence region identifier 720 after transmitting the retransmission signal including the URLLC interference influence identifier 710 and/or the URLLC interference influence region identifier 720 to the terminal 320.

Next, the operation of the terminal 320 will be described in more detail with reference to FIG. 9. At step 910, the terminal 320 may receive a signal. This signal may be an eMBB signal. In some embodiment, the terminal 320 may perform channel compensation and create a bit LLR for the received signal.

At step 920, the terminal 320 may determine whether the signal received at step 910 corresponds to a new signal or a retransmission signal.

If it is determined at step 920 that the signal received at step 910 is a new signal, the terminal 320 may perform a channel decoding at step 960.

On the other hand, if it is determined at step 920 that the signal received at step 910 is not new signal, the terminal 320 may determine this signal as a retransmission signal.

In addition, at step 930, the terminal 320 may check the interference influence information contained in the received retransmission signal. Since the interference influence information may include the URLLC interference influence identifier 710, the terminal 320 may confirm whether the signal received before the retransmission signal received at step 910 is affected by interference of the URLLC packets 420 and 425. Namely, by checking the URLLC interference influence identifier 710, the terminal 320 may know whether the previously received signal is affected by interference of a signal of the URLLC system.

If it is determined that the previously received signal is not affected by interference of the URLLC signal, the terminal 320 may combine, at step 940, the currently received retransmission signal with the LLR stored for the previously received signal.

On the other hand, if it is determined that the previously received signal is affected by interference of the URLLC signal, the terminal 320 may check URLLC interference influence region information at step 950. Namely, the terminal 320 may select a region unaffected by URLLC interference by checking the URLLC interference influence region identifier 720 and then identifying a region affected by URLLC interference in the previously received signal. For example, the terminal 320 may set the LLR of the region affected by URLLC interference to zero. Then the terminal 320 may combine the currently received retransmission signal with the LLR of the region unaffected by URLLC interference in the previously received signal.

For example, in the case of FIG. 7, the terminal 320 may check the URLLC interference influence region identifier 720, thereby identifying the first region 431, the second region 432, the fourth region 434, the fifth region 435 and the seventh region 437 where the eMBB packet 410 is not affected by interference of the URLLC packets 420 and 425. Then the terminal 320 may select the first region 431, the second region 432, the fourth region 434, the fifth region 435 and the seventh region 437 in the previously received signal and combine the currently received retransmission signal with the LLRs for these selected regions.

On the other hand, a part of the retransmission signal which is not overlapped with the previously received signal may be reflected as a new parity or a systematic value.

In this case, the LLR for a region having a CRC fail but having a large value other than the LLR value of 0 in the previously received signals may be excluded, thereby preventing deterioration.

Meanwhile, in case of receiving information about a rough region (e.g., a symbol group, a mini-slot group, a slot, etc.) including the region affected by interference through the interference influence region identifier 720, the terminal may estimate a detailed puncturing region by using the interference influence region identifier 720 and the LLR value stored in the soft buffer thereof through blind detection.

For example, the base station 310 may transmit the information 720 about the puncturing region affected by interference in units of code block (CB) to the terminal 320. In this case, the terminal 320 may estimate the puncturing region in units of mini-slot by using the received information 720 and the LLR value stored therein. Then the terminal 320 may set the LLR value corresponding to the punctured mini-slot to 0, and combine the LLR value with the LLR value of the newly received signal.

Alternatively, for example, the base station 310 may transmit the information 720 about the puncturing region affected by interference in units of mini-slot group to the terminal 320. In this case, the terminal 320 may estimate the puncturing region in units of mini-slot or in units of OFDM symbol by using the received information 720 and the LLR value stored therein. Then the terminal 320 may set the LLR value corresponding to the punctured mini-slot or the punctured OFDM symbol to 0, and combine the LLR value with the LLR value of the newly received signal For this, using the rough puncturing information 720 indicated by the base station 310, the terminal 320 may set a reference value as an average of absolute values of LLR values of the non-punctured regions (i.e., regions unaffected by interference) in the previously received signal.

For example, one transport block (TB) may be composed of several code blocks (CB). In this case, if the base station 310 instructs the terminal 320 on the puncturing information 720 in units of CB, the terminal 320 may set the reference value as an average of absolute values of LLR values for non-puncturing CBs.

Similarly, if the base station 310 instructs the terminal 320 on the puncturing information 720 in units of mini-slot group, the terminal 320 may set the reference value as an average of absolute values of LLR values for non-puncturing mini-slot groups.

Thereafter, the terminal 320 may divide the puncturing region, indicated through the puncturing information 720 by the base station 310, into small regions, e.g., OFDM symbols, mini-slots, PRB groups, or PRBs. Then the terminal 320 may calculate an average of absolute values of the LLR values for each region, and then compare the average with x % of the previously determined reference value to determine whether the region is a punctured region.

If the calculated average of the LLR values is smaller than x % of the reference value, the terminal 320 may determine that the corresponding region is a punctured region. Then the terminal 320 may set the LLR value to 0 and perform combining with the LLR value of a newly received signal.

If the calculated average of the LLR values is greater than x % of the reference value, the terminal 320 may determine that the corresponding region is not punctured. Then the terminal 320 may maintain the LLR values and perform combining with the LLR value of a newly received signal.

After step 940 or 950 or if the new signal is received as a result of determination at step 920, the terminal 320 may perform a channel decoding at step 960. Then the terminal 320 may perform a CRC check at step 970.

If the CRC check is successful, the terminal 320 may transmit an ACK message to the base station 310 at step 980.

If the CRC check fails, the terminal 320 may transmit a NACK message to the base station 310 at step 990. At this time, in some embodiment, the terminal 320 may create and store a bit LLR for the currently received signal. Alternatively, the terminal 320 may store the LLR created at step 910. Thereafter, the terminal 320 receives the signal retransmitted by the base station 310 in response to the NACK message.

As discussed heretofore, the base station 310 may add a several-bit indicator to the control channel of the HARQ retransmission packet so as to inform whether the previous transmission signal of the HARQ retransmission packet is affected by interference of a signal of any other system and also indicate information about the interference-affected region, and then transmit the several-bit indicator to the terminal 320. Alternatively, the base station 310 may transmit the interference influence information to the terminal 320 even before receiving the HARQ ACK/NACK signal from the terminal 320. Also, the base station 310 may transmit the eMBB retransmission packet to the terminal 320 even before receiving the HARQ ACK/NACK signal from the terminal 320.

Then the terminal 320 receives the interference influence information and the HARQ retransmission packet and, if the previously received signal is affected by interference of the signal of any other system, may perform a channel decoding by combining a signal of a region except the interference-affected region in the previously received signal with the retransmission signal.

Figure 10:
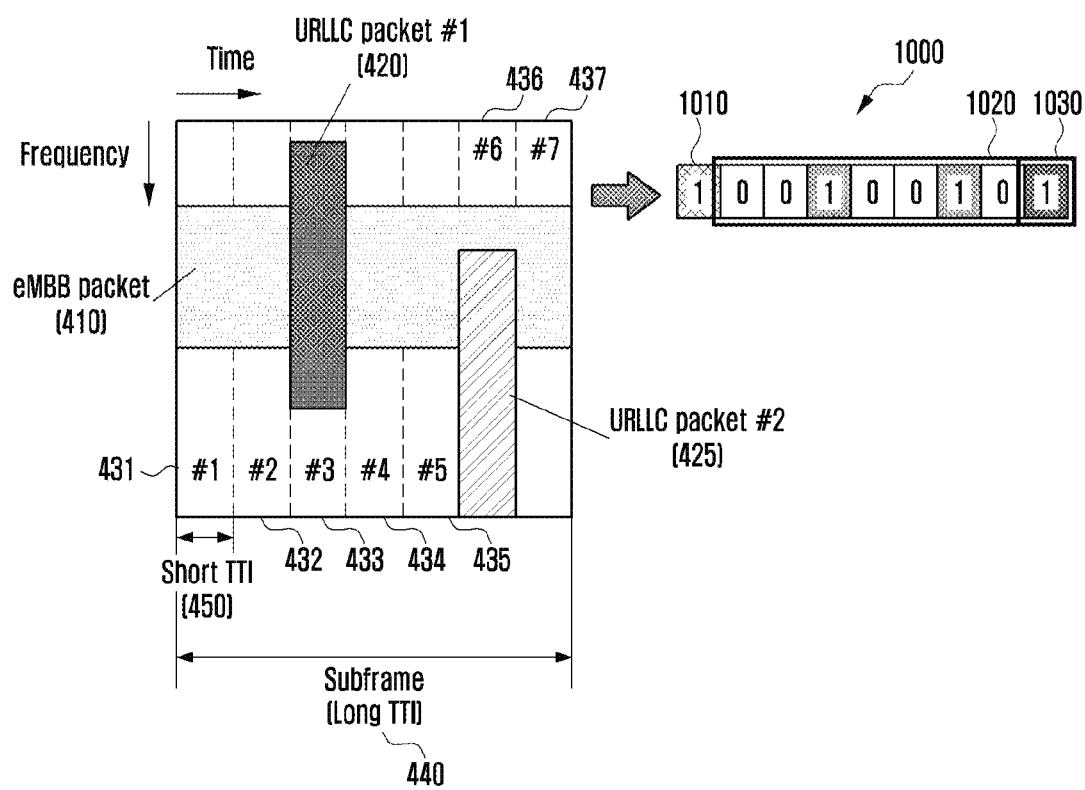
FIG. 10 illustrates yet another example interference influence information in case of coexistence between an eMBB packet and a URLLC packet according to an embodiment of the present disclosure.
Figure 11:
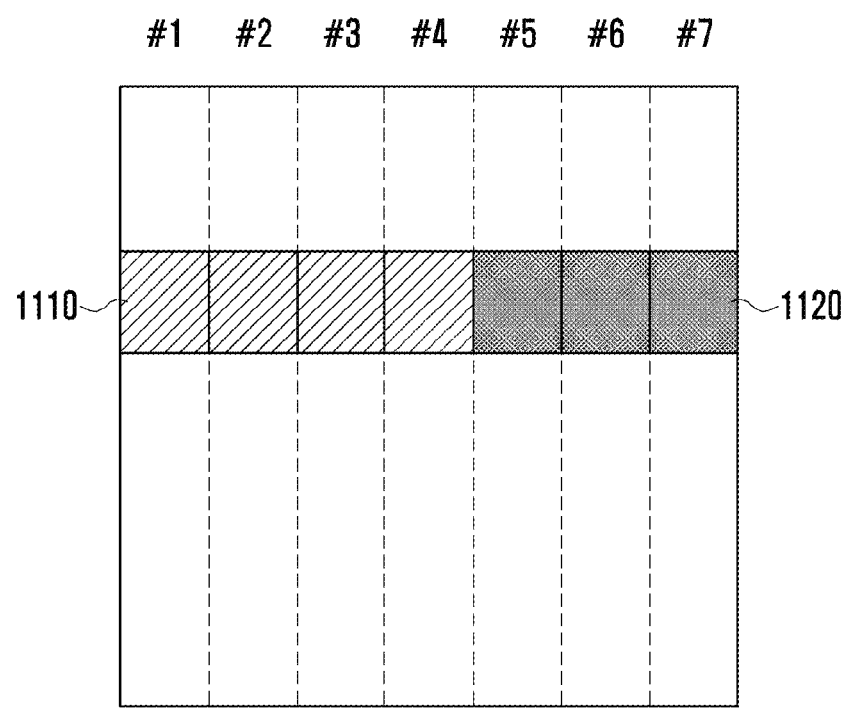
FIG. 11 illustrates an example retransmission packet of a base station according to an embodiment of the present disclosure.
Figure 12:
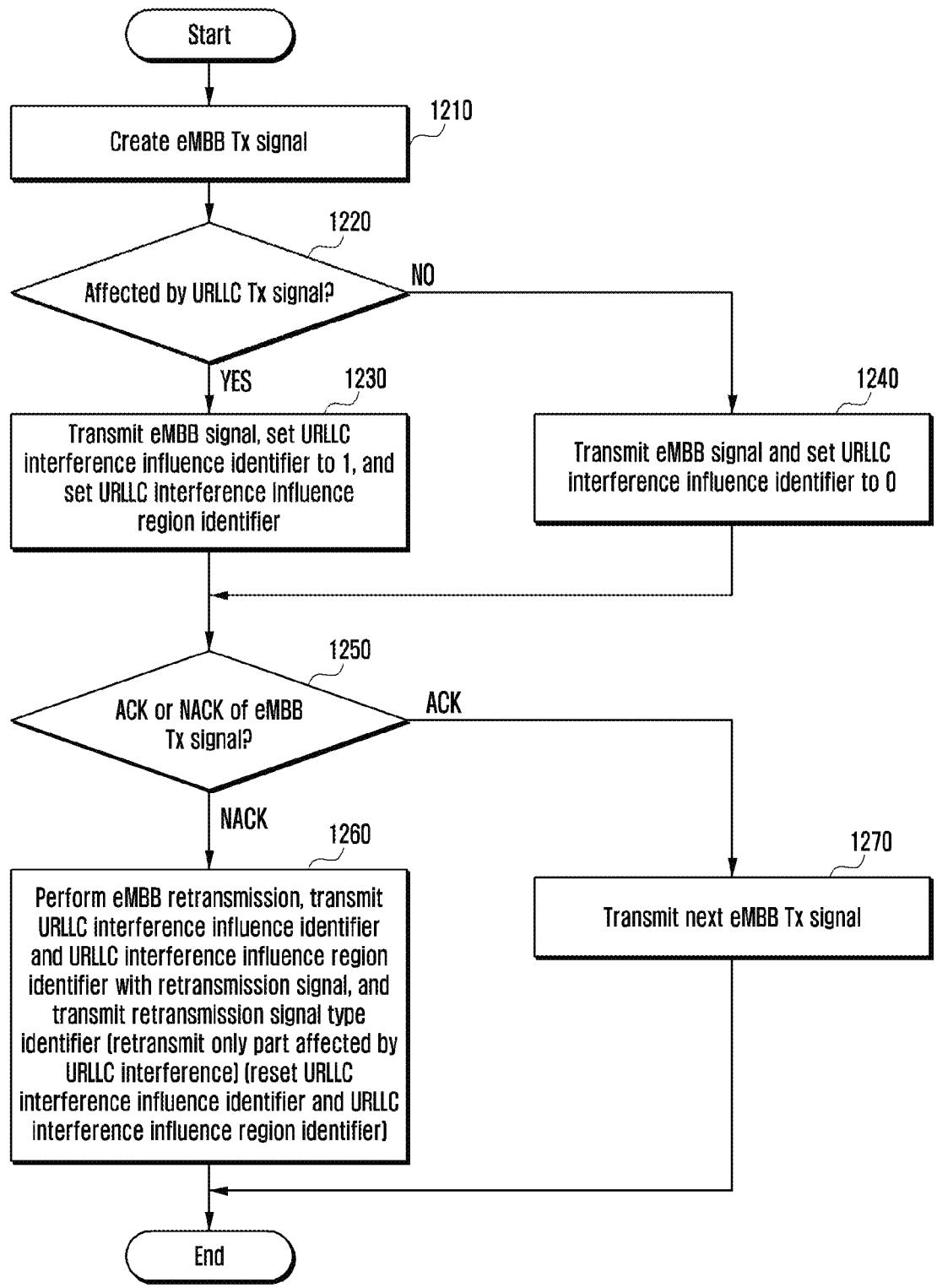
FIG. 12 illustrates an example operation of a base station according to still another embodiment of the present disclosure.
Figure 13:
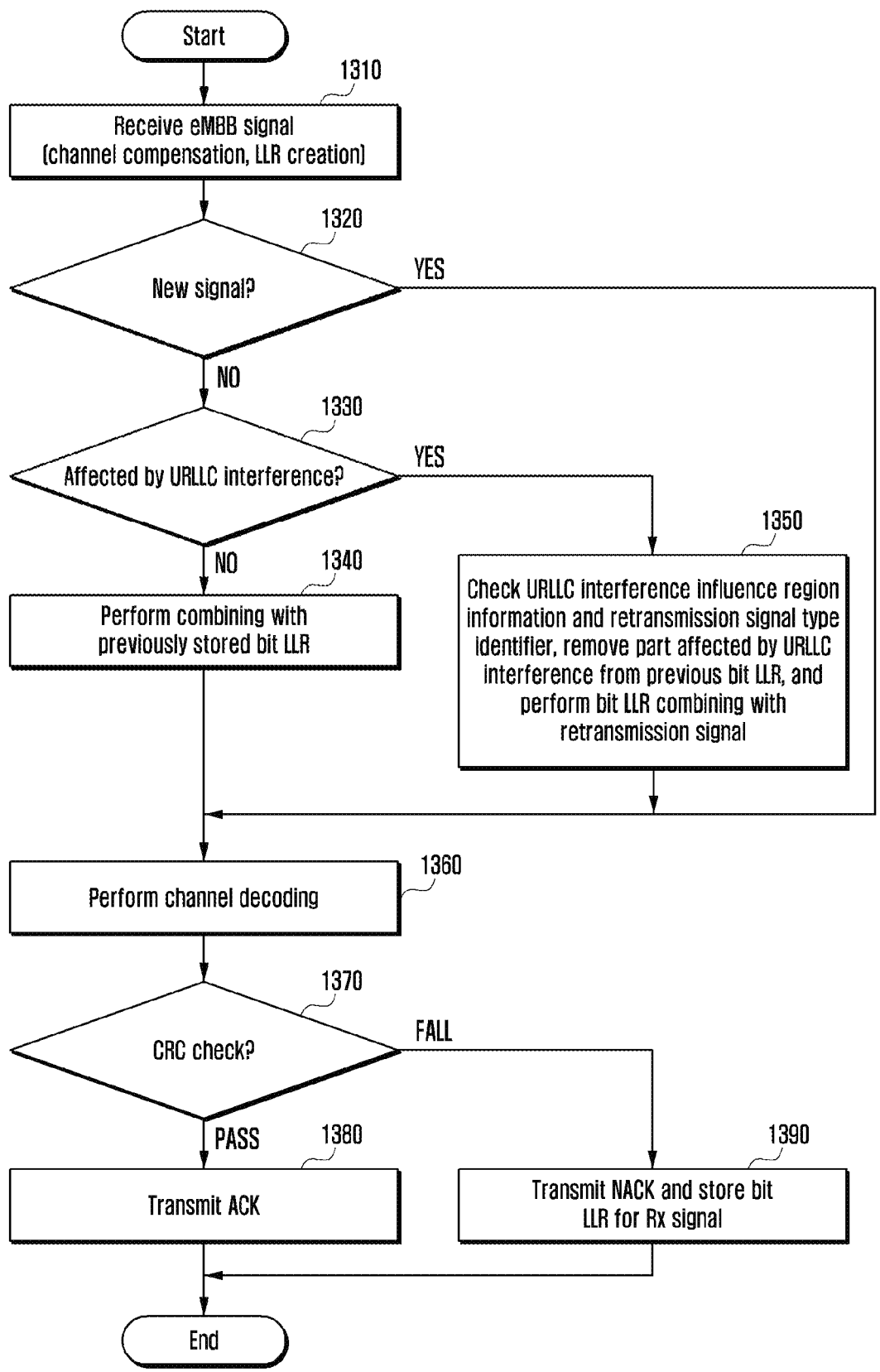
FIG. 13 illustrates an example operation of a terminal according to still another embodiment of the present disclosure.

FIG. 10 illustrates yet another example of interference influence information in case of coexistence between an eMBB packet and a URLLC packet according to an embodiment of the present disclosure, FIG. 11 illustrates an example retransmission packet of a base station according to an embodiment of the present disclosure, FIG. 12 illustrates an example operation of a base station according to still another embodiment of the present disclosure, and FIG. 13 illustrates an example operation of a terminal according to still another embodiment of the present disclosure.

Referring to FIG. 10, the eMBB packet 410 may be transmitted through a specific frequency region of all the subframes 430; 431, 432, 433, 434, 435, 436 and 437 according to the first TTI 440. In addition, the URLLC packets 420 and 425 may be scheduled according to the second TTI 450. For example, as earlier described in FIGS. 4 and 7, the first URLLC packet 420 may be transmitted in the third region 433, and the second URLLC packet 425 may be transmitted in the sixth area 436.

In this case, the base station 310 may inform the terminal 320 of information as to whether a transmission signal before an HARQ retransmission packet is affected by interference due to a signal of any other system. In addition, as earlier described in FIGS. 3 to 6, interference influence information 1000 may include an interference influence identifier 1010, e.g., a URLLC interference influence identifier.

Additionally, the interference influence information 1000 may further include information 1020 about a region affected by interference due to a signal of another system. For example, as earlier described in FIGS. 3 to 9, the information 1020 about the region affected by interference may be referred to as an interference influence region identifier 1020.

As shown in FIG. 11, the base station 310 may preferentially retransmit signals 1110 and 1120 affected by interference of the URLLC packets 420 and 425 to the terminal 320.

For example, as seen from FIG. 10, the eMBB packet 410 is affected by interference of the first URLLC packet 420 in the third region 433 and also affected by interference of the second URLLC packet 420 in the sixth region 436. In this case, the base station 310 may preferentially transmit the signal 1110 sent in the third region 433 and the signal 1120 sent in the sixth region 436 among the eMBB packet 410 to the terminal 320. In this case, the number of resource blocks (RBs) used for retransmission can be greatly reduced. Meanwhile, in some embodiment, in case of preferentially retransmitting the eMBB part affected by URLLC interference, the base station 310 may also retransmit some parts unaffected by the URLLC interference to utilize the resource block as much as possible. At this time, the base station 310 may transmit the retransmission packets 1110 and 1120 to the terminal 320 in units of OFDM symbol, RB, RB group, RE, RE group, CB, or CB group.

When the base station 310 preferentially retransmits the signals 1110 and 1120 affected by the URLLC packets 420 and 425 to the terminal 320, the terminal 320 needs to recognize that the signals 1110 and 1120 affected by the URLLC packets 420 and 425 are preferentially retransmitted.

Therefore, in this case, the base station 310 may insert information 1030 about a retransmission signal type into the interference influence information 1000. The information 1030 about the retransmission signal type indicates whether the base station 310 retransmits only a signal for a region affected by interference due to a signal of another system. This information 1030 may be formed of a 1-bit identifier. In case of preferentially retransmitting the signals 1110 and 1120 affected by the URLLC packets 420 and 425 to the terminal 320, the base station 310 may set the retransmission signal type information 1030 to correspond to be true (e.g., set the identifier to 1), and in the other case, the base station 310 may set the retransmission signal type information 1030 to correspond to be false (e.g., set the identifier to 0).

Meanwhile, in some embodiment, if the interference influence information 1000 includes the information 1020 about the region affected by interference and/or the information 1030 about the retransmission signal type, the interference influence identifier 1010 may not be included.

The interference influence identifier 1010, the interference influence region identifier 1020, and the retransmission signal type information 1030 may be contained in the interference influence information 1000 and transmitted to the terminal 320 when the HARQ retransmission packet is transmitted through the control channel.

Alternatively, in some embodiment, the base station 310 may transmit the interference influence information 1000 to the terminal 320 even before receiving the HARQ ACK/NACK signal from the terminal 320. Also, the base station 310 may retransmit the eMBB packets 1110 and 1120 affected by interference to the terminal 320 even before receiving the HARQ ACK/NACK signal from the terminal 320.

Meanwhile, in some embodiment, the base station 310 may add the interference influence information 1000 to the control channel and transmit the interference influence information 1000 to the terminal 320. For example, the interference influence information 1000 may be added to PDCCH or EPDCCH as an m-bit identifier and transmitted to the terminal 320. Here, the size of the m bits may be determined by how many regions the data area is divided into. Also, in some embodiment, the interference influence information 1000 may be transmitted through DCI of PDCCH.

The operation of the base station 310 will be described in more detail with reference to FIG. 12.

Steps 1210 to 1250 are similar to steps 810 to 850 described with reference to FIG. 8, and a detailed description thereof will be omitted.

If the ACK signal is received at step 1250, the base station 310 may create the next eMBB transmission signal and transmit the created signal to the terminal 320 at step 1270. In some embodiment, the base station 310 may initialize the URLLC interference influence identifier 1010 and/or the URLLC interference influence region identifier 1020 stored at step 1230 or 1240 if the ACK signal is received from the terminal 320.

On the other hand, if the NACK signal for the transmission signal is received, the base station 310 may retransmit the eMBB packet at step 1260. At this time, the base station 310 may transmit the URLLC interference influence identifier 1010 set at step 1230 or 1240 to the terminal 320 together with the retransmission signal.

In this case, if the URLLC interference influence region identifier 1020 is set at step 1230, the base station 310 may transmit the URLLC interference influence region identifier 1020 to the terminal 320 together with the retransmission signal at step 1260.

Meanwhile, in some embodiment, if the URLLC packets 420 and 425 interfere with the eMBB packet, the base station 310 may transmit the interference influence information 1000 including the set URLLC interference region identifier 1020 to the terminal 320. Namely, even before receiving the HARQ ACK/NACK signal from the terminal 320, the base station 310 may transmit the eMBB signal and the interference influence information 1000 to the terminal 320 at step 1230. Here, the interference influence information 1000 may further include the URLLC interference influence identifier 1010. The base station 310 may retransmit the eMBB packet at step 1260 regardless of whether the HARQ NACK signal is received from the terminal 320. For example, if the eMBB signal is transmitted in the n-th eMBB TTI, the interference influence information 1000 may be transmitted through the (n+k)-th eMBB TTI. In this case, the (n+k)-th eMBB TTI may be ahead of the retransmission eMBB TTI according to the HARQ ACK/NACK. If the eMBB signal is transmitted in the n-th eMBB TTI, the retransmission eMBB packet may be transmitted through the (n+k)-th eMBB TTI, which may be ahead of the retransmission eMBB TTI according to the HARQ ACK/NACK.

Meanwhile, as described above, the base station 310 may preferentially retransmit the signals 1110 and 1120 affected by interference of the URLLC packets 420 and 425 to the terminal 320. In this case, the base station 310 may transmit the retransmission signal type information 1030 indicating whether only the signal for the region affected by interference of other system signal is retransmitted, to the terminal 320 together with the retransmission signal. Meanwhile, in some embodiment, the retransmission signal may also include some parts other than the signals 1110 and 1120 affected by interference of the URLLC packets 420 and 425. This can increase the utilization of the remaining resource element (RE) in the allocated RB.

In some embodiment, the base station 310 may add the URLLC interference influence identifier 1010 and/or the URLLC interference influence region identifier 1020 and/or the retransmission signal type information 1030 to the control channel to be transmitted to the terminal 320. For example, the interference influence information 1000 including the URLLC interference influence identifier 1010 and/or the URLLC interference influence region identifier 1020 and/or the retransmission signal type information 1030 may be added to PDCCH or EPDCCH and transmitted to the terminal 320.

Then the base station 310 may initialize the URLLC interference influence identifier 1010 and/or the URLLC interference influence region identifier 1020 and/or the retransmission signal type information 1030.

Next, the operation of the terminal 320 will be described in more detail with reference to FIG. 13.

Steps 1310 to 1340 are similar to steps 910 to 940 described with reference to FIG. 9, and a detailed description thereof will be omitted.

If it is determined at step 1330 that the previously received signal is affected by interference of the URLLC signal, the terminal 320 may check the URLLC interference influence region information at step 1350. Namely, the terminal 320 may select a region unaffected by URLLC interference by checking the URLLC interference influence region identifier 1020 and then identifying a region affected by URLLC interference in the previously received signal. For example, the terminal 320 may set the LLR of the region affected by URLLC interference to zero.

At this time, the terminal 320 may check whether the base station 310 has preferentially retransmitted the signals 1110 and 1120 affected by interference of the URLLC packets 420 and 425 to the terminal 320. If the retransmission signal type information 1030 indicates that the base station 310 does not preferentially retransmit the signals 1110 and 1120 affected by interference of the URLLC packets 420 and 425 to the terminal 320, the terminal 320 may combine the currently received retransmission signal with the LLR of the region unaffected by URLLC interference in the previously received signal as being similar to step 950 in FIG. 9. Meanwhile, the terminal 320 may estimate a detailed puncturing region through the blind detection described with reference to FIG. 9.

On the other hand, if the retransmission signal type information 1030 indicates that the base station 310 preferentially retransmits the signals 1110 and 1120 affected by interference of the URLLC packets 420 and 425 to the terminal 320, the terminal 320 may confirm that the retransmission signal is for a region affected by interference of the URLLC signal in the previously received signal. Then the terminal 320 may control the interference-affected region in the previously received signal, and perform an LLR combining of the signal of the interference-unaffected region and the retransmission signal. Namely, the terminal 320 may replace the signal for the interference-affected region in the previously received signal with the retransmission signal. For example, the terminal 320 may confirm that the retransmission signal is eMBB signals corresponding to the third and sixth regions 433 and 436, and then may replace the LLR values of the third and sixth regions 433 and 436 in the previously received signal with the LLR value for the retransmission signal. At this time, since the LLR value of the interference-affected region is set to 0, the LLR value of the retransmission signal may be implemented by addition operation with the LLR values of the regions 433 and 436.

If the retransmission signal includes some parts other than the signals 1110 and 1120 affected by interference of the URLLC packets 420 and 425, the terminal 320 may combine a part other than the retransmission signal for the region affected by interference of the URLLC signal in the previously received signal with the LLR value for the previously received signal. In addition, a part of the retransmission signal which is not overlapped with the previously received signal may be reflected as a new parity (or systematic) value.

After step 1340 or 1350 or if the new signal is received as a result of determination at step 1320, the terminal 320 may perform a channel decoding at step 1360. Then the terminal 320 may perform a CRC check at step 1370.

If the CRC check is successful, the terminal 320 may transmit an ACK message to the base station 310 at step 1380.

If the CRC check fails, the terminal 320 may transmit a NACK message to the base station 310 at step 1390. At this time, in some embodiment, the terminal 320 may create and store a bit LLR for the currently received signal. Alternatively, the terminal 320 may store the LLR created at step 1310. Thereafter, the terminal 320 receives the signal retransmitted by the base station 310 in response to the NACK message.

As discussed heretofore, the base station 310 may add a several-bit indicator to the control channel of the HARQ retransmission packet so as to inform whether the previous transmission signal of the HARQ retransmission packet is affected by interference of a signal of any other system, so as to offer information about the interference-affected region, and so as to offer information about the retransmission type, and then transmit the several-bit indicator to the terminal 320. Then the terminal 320 receives the HARQ retransmission packet and, if the previously received signal is affected by interference of the signal of any other system, may perform a channel decoding by combining a signal of a region except the interference-affected region in the previously received signal with the retransmission signal. If the base station 310 preferentially transmits a signal affected by interference of any other system, the terminal 320 may recognize the signal affected by interference of any other system and then perform a channel decoding by replacing this with the retransmission signal.

Figure 14:
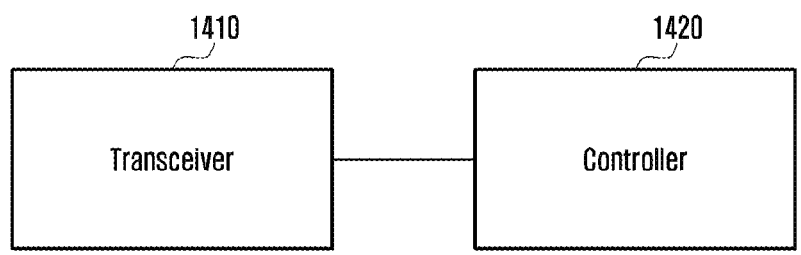
FIG. 14 illustrates an example base station according to an embodiment of the present disclosure.

FIG. 14 illustrates an example base station according to an embodiment of the present disclosure.

Referring to FIG. 14, in an embodiment, the base station 310 may include a transceiver 1410 and a controller 1420. The controller 1420 controls the overall operations of the base station 310.

The controller 1420 of the base station 310 controls the base station 310 to perform the operation of any one of the above-described embodiments. For example, the controller 1420 may set interference influence information that includes information about interference of the second signal of the second system using the second TTI with regard to the first signal of the first system using the first TTI, and may transmit the first signal of the first system to the terminal 320. If a retransmission request signal is received from the terminal 320, the controller 1420 may send a retransmission signal including the interference influence information.

In addition, the transceiver 1410 of the base station 310 may transmit and receive signals in accordance with the operation of any one of the above-described embodiments. For example, the transceiver 1410 may transmit the first signal of the first system, receive the retransmission request message from the terminal 320, and transmit the retransmission signal to the terminal 320.

Figure 15:
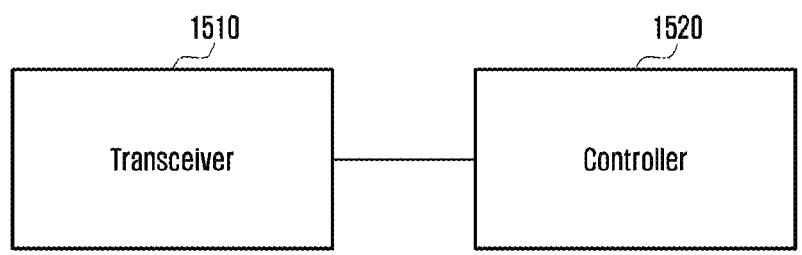
FIG. 15 illustrates an example terminal according to an embodiment of the present disclosure.

FIG. 15 illustrates an example terminal according to an embodiment of the present disclosure.

Referring to FIG. 15, in an embodiment, the terminal 320 may include a transceiver 1510 and a controller 1520. The controller 1520 controls the overall operations of the terminal 320.

The controller 1520 of the terminal 320 controls the terminal 320 to perform the operation of any one of the above-described embodiments. For example, if the first signal of the first system using the first TTI is received from the base station 310, and if a channel decoding fails, the controller 1520 may send a retransmission request message to the base station 310. Also, the controller 1520 may receive from the base station 310 a retransmission signal that contains interference influence information including information about interference of the second signal of the second system using the second TTI with regard to the first signal of the first system using the first TTI. And also, using the received interference influence information, the controller 1520 may perform a channel decoding of a received signal for the retransmission signal.

In addition, the transceiver 1510 of the terminal 320 may transmit and receive signals in accordance with the operation of any one of the above-described embodiments. For example, the transceiver 1510 may receive the first signal of the first system from the base station 310, transmit the retransmission request message to the base station 310 when the channel decoding fails, and receive the retransmission signal from the base station 310.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method performed by a base station in a wireless communication system, the method comprising:
  transmitting, to a terminal, first data;
  transmitting, to the terminal, downlink control information (DCI) comprising first information indicating whether second data being transmitted is combinable with the transmitted first data; and
  transmitting, to the terminal, the second data based on the DCI,
  wherein at least one of the first data or the second data is transmitted based on a code block group (CBG),
  wherein in case that the first information indicating that the second data being transmitted is not combinable with the transmitted first data, the first data is considered to be corrupted, and wherein in case that the first information indicating that the second data being transmitted is combinable with the transmitted first data, the second data is combined with the first data.

2. The method of claim 1, wherein the transmitting of the DCI comprises:
receiving, from the terminal, a negative acknowledgment message for the first data; and
transmitting, to the terminal, the DCI comprising the first information indicating whether the second data being transmitted is combinable with the transmitted first data, and scheduling information for transmitting the second data.

3. The method of claim 1, further comprising:
transmitting, to the terminal, second information including resource information where no transmission is intended for the terminal.

4. A method performed by a terminal in a wireless communication system, the method comprising:
receiving, from a base station, first data;
receiving, from the base station, downlink control information (DCI) comprising first information indicating whether second data being received is combinable with the received first data;
receiving, from the base station, the second data based on the DCI; and
decoding the second data based on the first information,
wherein at least one of the first data or the second data is received based on a code block group (CBG),
wherein in case that the first information indicating that the second data being received is not combinable with the received first data, the first data is considered to be corrupted, and
wherein in case that the first information indicating that the second data being received is combinable with the received first data, the second data is combined with the first data.

5. The method of claim 4, wherein the receiving of the DCI comprises:
transmitting, to the base station, a negative acknowledgment message for the first data; and
receiving, from the base station, the DCI comprising the first information indicating whether the second data being received is combinable with the received first data, and scheduling information for transmitting the second data.

6. The method of claim 4, further comprising:
receiving, from the base station, second information including resource information; and
identifying that no transmission is intended for the terminal in a resource indicated by the second information.

7. A base station in a wireless communication system, the base station comprising:
a transceiver; and
a controller coupled with the transceiver and configured to:
transmit, to a terminal, first data,
transmit, to the terminal, downlink control information (DCI) comprising first information indicating whether second data being transmitted is combinable with the transmitted first data, and
transmit, to the terminal, the second data based on the DCI,
wherein at least one of the first data or the second data is transmitted based on a code block group (CBG),
wherein in case that the first information indicating that the second data being transmitted is not combinable with the transmitted first data, the first data is considered to be corrupted, and
wherein in case that the first information indicating that the second data being transmitted is combinable with the transmitted first data, the second data is combined with the first data.

8. The base station of claim 7, wherein the controller is configured to:
receive, from the terminal, a negative acknowledgment message for the first data, and
transmit, to the terminal, the DCI comprising the first information indicating whether the second data being transmitted is combinable with the transmitted first data, and scheduling information for transmitting the second data.

9. The base station of claim 7, wherein the controller is configured to:
transmit, to the terminal, second information including resource information where no transmission is intended for the terminal.

10. A terminal in a wireless communication system, the terminal comprising:
a transceiver; and
a controller coupled with the transceiver and configured to:
receive, from a base station, first data,
receive, from the base station, downlink control information (DCI) comprising first information indicating whether second data being received is combinable with the received first data,
receive, from the base station, the second data based on the DCI, and
decode the second data based on the first information,
wherein at least one of the first data or the second data is received based on a code block group (CBG),
wherein in case that the first information indicating that the second data being received is not combinable with the received first data, the first data is considered to be corrupted, and
wherein in case that the first information indicating that the second data being received is combinable with the received first data, the second data is combined with the first data.

11. The terminal of claim 10, wherein the controller is configured to:
transmit, to the base station, a negative acknowledgment message for the first data, and
receive, from the base station, the first information indicating whether the second data being received is combinable with the received first data, and scheduling information for transmitting the second data.

12. The terminal of claim 10, wherein the controller is configured to:
receive, from the base station, the DCI comprising second information including resource information, and
identify that no transmission is intended for the terminal in a resource indicated by the second information.

* * * * *